US012489565B2

(12) United States Patent
Zhao et al.

(10) Patent No.: US 12,489,565 B2
(45) Date of Patent: Dec. 2, 2025

(54) INFORMATION PROCESSING METHOD AND APPARATUS, STORAGE MEDIUM, PROCESSOR AND ELECTRONIC DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/742,708

(22) Filed: Jun. 13, 2024

(65) Prior Publication Data

US 2024/0333434 A1    Oct. 3, 2024

Related U.S. Application Data

(63) Continuation of application No. 17/819,252, filed on Aug. 11, 2022, now Pat. No. 12,052,105, which is a (Continued)

(30) Foreign Application Priority Data

Feb. 14, 2020  (WO) ............... PCT/CN2020/075431
Mar. 12, 2020  (WO) ............... PCT/CN2020/079061

(51) Int. Cl.
*H04L 1/1812*  (2023.01)
*H04L 1/1829*  (2023.01)
(Continued)

(52) U.S. Cl.
CPC .......... *H04L 1/1812* (2013.01); *H04L 1/1854* (2013.01); *H04W 72/23* (2023.01); *H04W 76/14* (2018.02)

(58) Field of Classification Search
CPC ... H04L 1/1812; H04L 1/1854; H04L 1/1822; H04W 72/02; H04W 72/04; H04W 72/12;
(Continued)

(56) References Cited

U.S. PATENT DOCUMENTS

2016/0345312 A1   11/2016   Kim
2018/0176892 A1    6/2018   Kim
(Continued)

FOREIGN PATENT DOCUMENTS

CN   105991247 A   10/2016
CN   107277856 A   10/2017
(Continued)

OTHER PUBLICATIONS

First Office Action of the Chinese application No. 202310194593.9, issued on Aug. 14, 2024, 18 pages with English translation.
(Continued)

*Primary Examiner* — Shelly A Chase
(74) *Attorney, Agent, or Firm* — PERKINS COIE LLP

(57) ABSTRACT

An information processing method and apparatus, a storage medium, a processor and an electronic device are provided. The method includes: configuration information is received from a network side device, the configuration information being used for configuring a sidelink configured grant transmission resource, and the sidelink configured grant transmission resource being a transmission resource in a resource pool; time-domain information corresponding to the sidelink configured grant transmission resource is determined on the basis of the configuration information; and according to the time-domain information corresponding to the sidelink configured grant transmission resource, a first hybrid automatic repeat request process ID is determined.

20 Claims, 13 Drawing Sheets

Receive configuration information from a network side device, wherein the configuration information is used for configuring a Sidelink Configured Grant transmission resource, and the Sidelink Configured Grant transmission resource is a transmission resource located in a resource pool — S70

Determine time domain information corresponding to the Sidelink Configured Grant transmission resource based on the configuration information — S71

Determine a first Hybrid Automatic Repeat reQuest process identity (ID) according to the time domain information corresponding to the Sidelink Configured Grant transmission resource — S72

Related U.S. Application Data continuation of application No. PCT/CN2020/090368, filed on May 14, 2020.

(51) Int. Cl.
  *H04W 72/23* (2023.01)
  *H04W 76/14* (2018.01)

(58) Field of Classification Search
  CPC ..... H04W 72/20; H04W 72/25; H04W 72/40; H04W 72/121; H04W 72/0446
  See application file for complete search history.

(56) References Cited

U.S. PATENT DOCUMENTS

| | | | |
|---|---|---|---|
| 2019/0208506 | A1 | 7/2019 | Baldemair et al. |
| 2020/0092692 | A1 | 3/2020 | Wang |
| 2020/0119858 | A1 | 4/2020 | Ren |
| 2020/0178273 | A1 | 6/2020 | Lu |
| 2020/0236656 | A1 | 7/2020 | Cao |
| 2020/0322939 | A1* | 10/2020 | Cao .............. H04W 72/02 |
| 2020/0404655 | A1 | 12/2020 | Salem |
| 2021/0099994 | A1* | 4/2021 | Park .............. H04L 1/1861 |
| 2021/0314991 | A1 | 10/2021 | Tenny |
| 2021/0345397 | A1* | 11/2021 | Li .............. H04L 1/1822 |
| 2022/0346066 | A1 | 10/2022 | Liu |

FOREIGN PATENT DOCUMENTS

| | | |
|---|---|---|
| CN | 108923894 A | 11/2018 |
| CN | 109150419 A | 1/2019 |
| CN | 109392099 A | 2/2019 |
| CN | 109691210 A | 4/2019 |
| CN | 109714824 A | 5/2019 |
| CN | 110115061 A | 8/2019 |
| CN | 110536445 A | 12/2019 |
| CN | 110545524 A | 12/2019 |
| CN | 112584500 A | 3/2021 |
| CN | 113519196 A | 10/2021 |
| EP | 3500022 A1 | 6/2019 |
| RU | 2649874 C1 | 4/2018 |
| RU | 2699069 C1 | 9/2019 |

OTHER PUBLICATIONS

Second Office Action of the Chinese application No. 202310194593.9, issued on Nov. 1, 2024, 15 pages with English translation.
Supplementary European Search Report in the European application No. 24179026.0, mailed on Sep. 10, 2024, 16 pages.
Hearing Notice of the Indian application No. 202227046156, issued on Nov. 5, 2024, 2 pages with English translation.
3GPP TSG RAN WG1 #99—R1-1912790—Reno, USA, Nov. 18-22, 2019—OPPO, Mode 1 resource allocation for NR SL (11 pages).
3GPP TSG RAN WG1 Meeting #97—R1-1906010—Reno, USA, May 13-17, 2019—Huawei, HiSilicon—Discussion on sidelink resource allocation mode 1 (9 pages).
3GPP TSG RAN WG1 Meeting #99—R1-1911883—Reno, USA, Nov. 18-22, 2019—Huawei, HiSilicon—Sidelink resource allocation mode 1 (24 pages).
3GPP TSG-RAN WG2 Meeting #107bis—R2-1913868—Chongqing, China, Oct. 14-18, 2019 (Resubmission of R2-1911411)—ITL, Sid el ink HARQ retransmission in mode 1 (2 pages).
International Search Report mailed Nov. 12, 2020 of PCT/CN2020/075431 (4 pages).
International Search Report mailed Nov. 18, 2020 of PCT /CN2020/079061 (4 pages).
International Search Report mailed Oct. 10, 2020 of PCT/CN2020/090368 (4 pages).
Written Opinion mailed Oct. 10, 2020 of PCT/CN2020/090368 (8 pages).
3GPP "Technical Specification: Physical channels and modulation (Release 15)" 3GPP TS 28.211 V15.8.0 (Dec. 2019). 93 pages.
CATT "Remaining Issues on SL HARQ" R2-1914443; 3GPP TSG-RAN WG2 Meeting #108; Reno, USA; Nov. 18-22, 2019. 4 pages.
Ericsson "Feature lead summary #3 on Resource allocation for NR sidelink Mode 1" R1-1911713; 3GPP TSG-RAN WG1 Meeting #98bis; Chongqing, China; Oct. 14-20, 2019. 42pages.
Huawei et al. "Discussion on HARQ support for NR sidelink" R2-1913701; 3GPP TSG-RAN WG2 #107bis; Chongqing, China; Oct. 14-18, 2019. 17 pages.
Intel Corporation "Remaining issues on sidelink configured grant design" R2-1914851; 3GPP TSG-RAN WG2 Meeting #108; Reno, US; Nov. 18-22, 2019. 5 pages.
Spreadtrum Communications "Consideration on NR sidelink mode 1 resource allocation" R1-1910006; 3GPP TSG RAN WG1 #98bis; Chongqing, China; Oct. 14-20, 2019. 4 pages.
Written Opinion for International Application No. PCT/CN2020/075431 issued Nov. 12, 2020. 6 pages with English translation.
Written Opinion for International Application No. PCT/CN2020/079061 issued Nov. 12, 2020. 7 pages with English translation.
Examination Report for Indian Application No. 202227046156 issued Nov. 25, 2022. 5 pages with English translation.
First Office Action of the RU application No. 2022124114, issued on May 25, 2023. 9 pages with English translation.
Search Report of the EP application No. 20918476.1, issued on Apr. 26, 2023. 16 pages.
Huawei et al, Sidelink resource allocation mode 1. 3GPP TSG RAN WG1 Meeting #98 Prague, Czech Republic, Aug. 26-30, 2019, R1-1908041. 14 pages.
OPPO, Discussion on multiple configured grants. 3GPP TSG-RAN WG2 Meeting #108 Reno, US, Nov. 18-Nov. 22, 2019, R2-1915816. 5 pages.
3rd Generation Partnership Project; Technical Specification Group Radio Access Network; NR; Medium Access Control (MAC) protocol specification (Release 15). 3GPP TS 38.321 V15.8.0, Jan. 7, 2020, XP51860530A, 78 pages.
First Office Action of the Japanese application No. 2022-549077, issued on Feb. 9, 2024. 8 pages with English translation.
ZTE, Sanechips, R1-1717442,"Remaining details of UL transmission without grant" 3GPP TSG RAN WG1 Meeting 90bis, Prague, CZ, Oct. 9-13, 2017. 10 pages.
Spreadtrum Communications, R1-1902725,"Consideration on NR Uu-based sidelink resource allocation" 3GPP TSG RAN WG1 #96, Athens, Greece, Feb. 25-Mar. 1, 2019. 5 pages.
Ericsson, R1-1910533,"Uu-based sidelink resource allocation" 3GPP TSG-RAN WG1 Meeting #98bis, Chongqing, China, Oct. 14-20, 2019. 20 pages.
Vivo, R1-1911419,"Discussion on mode 1 resource allocation mechanism" 3GPP TSG RAN WG1 Meeting #98bis, Chongqing, China, Oct. 14-20, 2019. 17 pages.
ZTE, Sanechips, R1-1912552,"Mode 1 resource allocation schemes on sidelink" 3GPP TSG RAN WG1 #99, Reno, Nevada, US, Nov. 18-22, 2019. 11 pages.
Non-Final Office Action of the U.S. Appl. No. 17/819,252, issued on Nov. 15, 2023, 31 pages.
Notice of Allowance of the U.S. Appl. No. 17/819,252, issued on Mar. 14, 2024, 11 pages.
Supplemental Notice of Allowance of the U.S. Appl. No. 17/819,252, issued on May 30, 2024, 7 pages.
First Office Action of the Indonesian application No. P00202208638, issued on Dec. 27, 2024, 5 pages with English translation.
First Office Action of the Korean application No. 10-2022-7030430, issued on Jun. 30, 2025.
Written Opinion of the Singaporean application No. 11202252145P, issued on Sep. 23, 2025, 10 pages.

\* cited by examiner

INFORMATION PROCESSING METHOD AND APPARATUS, STORAGE MEDIUM, PROCESSOR AND ELECTRONIC DEVICE

CROSS-REFERENCE TO RELATED APPLICATIONS

The present application is a continuation application of U.S. patent application Ser. No. 17/819,252, filed on Aug. 11, 2022, which is a continuation application International PCT Application No. PCT/CN2020/090368, filed on May 14, 2020, which claims priority to PCT International Application No. PCT/CN2020/075431 having an application date of Feb. 14, 2020, and to PCT International Application No. PCT/CN2020/079061 having an application date of Mar. 12, 2020. The above-identified applications are incorporated herein by reference in their entireties.

TECHNICAL FIELD

The present disclosure relates to the communication field, in particular to an information processing method and apparatus, a storage medium, a processor, and an electronic apparatus.

BACKGROUND

At present, in the related art, in a process of determining a Hybrid Automatic Repeat reQuest (HARQ) process identity (ID) in a New Radio (NR) Uu system, a base station may allocate a downlink transmission resource of Semi-Persistent Schedule (SPS) for a terminal. When configuring the downlink SPS transmission resource, the base station may configure multiple HARQ process IDs for each set of SPS transmission resources. In addition, in an NR system, the base station may also allocate Uplink Configured Grant (UL CG for short) to the terminal. When configuring the UL CG resource, the base station may configure multiple HARQ process IDs for each set of UL CG resources.

It may be seen that in the related art, only a method for determining a HARQ process ID is provided when the base station configures the downlink SPS transmission resource or the UL CG resource, however a method for determining a HARQ process ID for Sidelink (SL) Configured Grant (CG for short) is not involved.

In view of the above problem, no effective solution has been put forward at present.

SUMMARY

At least part of embodiments of the present disclosure provide an information processing method and apparatus, a storage medium, a processor, and an electronic apparatus to at least solve a technical problem of lack of a method for determining a HARQ process identity (ID) for Sidelink Configured Grant in the related art.

According to an embodiment of the present disclosure, an information processing method is provided, including: receiving configuration information from a network side device, wherein the configuration information is used for configuring a Sidelink Configured Grant transmission resource, and the Sidelink Configured Grant transmission resource is a transmission resource located in a resource pool; determining time domain information corresponding to the Sidelink Configured Grant transmission resource based on the configuration information; and determining a first Hybrid Automatic Repeat reQuest process identity (ID) according to the time domain information corresponding to the Sidelink Configured Grant transmission resource.

Optionally, the determining the first Hybrid Automatic Repeat reQuest process ID according to the time domain information corresponding to the Sidelink Configured Grant transmission resource includes: determining a period parameter based on the configuration information, wherein the period parameter is a period of the Sidelink Configured Grant transmission resource; and determining the first Hybrid Automatic Repeat reQuest process ID according to the time domain information corresponding to the Sidelink Configured Grant transmission resource and the period parameter.

Optionally, the period of the Sidelink Configured Grant transmission resources is represented by a number of slots.

Optionally, the time domain information corresponding to the Sidelink Configured Grant transmission resource is a slot index of the Sidelink Configured Grant transmission resource in the resource pool.

Optionally, the method further includes: transmitting first sidelink data on the Sidelink Configured Grant resource, wherein the first sidelink data corresponds to the first Hybrid Automatic Repeat reQuest process ID.

Optionally, the method further includes: receiving downlink control information from the network side device, wherein the downlink control information is used for scheduling a sidelink transmission resource, and the downlink control information carries the first Hybrid Automatic Repeat reQuest process ID; and retransmitting the first sidelink data on the sidelink transmission resource scheduled by the downlink control information.

Optionally, the method further includes: transmitting second sidelink data on the Sidelink Configured Grant transmission resource based on a mapping relationship between the first Hybrid Automatic Repeat reQuest process ID and a second Hybrid Automatic Repeat reQuest process ID, wherein the second sidelink data corresponds to the second Hybrid Automatic Repeat reQuest process ID.

Optionally, the method further includes: receiving downlink control information from the network side device, wherein the downlink control information is used for scheduling a sidelink transmission resource, and the downlink control information carries the first Hybrid Automatic Repeat reQuest process ID; and retransmitting the second sidelink data on the sidelink transmission resource scheduled by the downlink control information.

According to an embodiment of the present disclosure, another information processing method is also provided, including: determining first configuration information, wherein the first configuration information is used for configuring a Sidelink Configured Grant transmission resource, and the Sidelink Configured Grant transmission resource is a transmission resource located in a resource pool; determining time domain information corresponding to the Sidelink Configured Grant transmission resource based on the first configuration information; and determining a first Hybrid Automatic Repeat reQuest process ID according to the time domain information corresponding to the Sidelink Configured Grant transmission resource.

Optionally, the determining the first Hybrid Automatic Repeat reQuest process ID according to the time domain information corresponding to the Sidelink Configured Grant transmission resource includes: determining a period parameter based on the first configuration information, wherein the period parameter is a period of the Sidelink Configured Grant transmission resource; and determining the first Hybrid Automatic Repeat reQuest process ID according to the time domain information corresponding to the Sidelink Configured Grant transmission resource and the period parameter.

Optionally, the period of the Sidelink Configured Grant transmission resources is represented by a number of slots.

Optionally, the time domain information corresponding to the Sidelink Configured Grant transmission resource is a slot index of the Sidelink Configured Grant transmission resource in the resource pool.

Optionally, the determining the time domain information corresponding to the Sidelink Configured Grant transmission resource based on the first configuration information includes: receiving an uplink control channel sent by a terminal on an uplink transmission resource based on the first configuration information, wherein the uplink transmission resource and the Sidelink Configured Grant transmission resource belong to a same Sidelink Configured Grant period, and the uplink control channel is used for the terminal to report sidelink feedback information; and determining the time domain information corresponding to the Sidelink Configured Grant transmission resource according to time domain information of the uplink transmission resource.

Optionally, the method further includes: determining at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the determining the time domain information corresponding to the Sidelink Configured Grant transmission resource according to the time domain information of the uplink transmission resource includes: determining the time domain information corresponding to the Sidelink Configured Grant transmission resource according to the time domain information of the uplink transmission resource and at least one of the first parameter and the second parameter.

Optionally, the first configuration information is further used for configuring at least one of the uplink transmission resource and the first parameter.

Optionally, the method further includes: sending second configuration information to a terminal, wherein the second configuration information is used for configuring a resource pool; and determining a second parameter according to the second configuration information.

Optionally, the method further includes: sending downlink control information to the terminal when an uplink control channel carries non-acknowledgement information, wherein the downlink control information is used for scheduling a sidelink transmission resource, the downlink control information carries the first Hybrid Automatic Repeat reQuest process ID, and the downlink control information is used for scheduling the terminal to retransmit sidelink data corresponding to the first Hybrid Automatic Repeat reQuest process ID on the sidelink transmission resource.

Optionally, the method further includes: sending the first configuration information to a terminal, wherein the first configuration information is further used for the terminal to determine the time domain information corresponding to the Sidelink Configured Grant transmission resource and to determine the first Hybrid Automatic Repeat reQuest process ID according to the time domain information corresponding to the Sidelink Configured Grant transmission resource.

According to an embodiment of the present disclosure, another information processing method is also provided, including: determining first configuration information, wherein the first configuration information is used for configuring an uplink transmission resource; determining time domain information corresponding to the uplink transmission resource based on the first configuration information; and determining a first Hybrid Automatic Repeat reQuest process ID according to the time domain information corresponding to the uplink transmission resource.

Optionally, the method further includes: determining a period parameter based on the first configuration information, wherein the first configuration information is further used for configuring a Sidelink Configured Grant transmission resource, the Sidelink Configured Grant transmission resource is used for transmitting sidelink data, and the period parameter is used for determining a period of the Sidelink Configured Grant transmission resource; and determining the first Hybrid Automatic Repeat reQuest process ID according to the time domain information corresponding to the uplink transmission resource and the period parameter. Herein, the Sidelink Configured Grant transmission resource and the uplink transmission resource are associated, that is, sidelink feedback information corresponding to the sidelink data transmitted on the Sidelink Configured Grant transmission resource is transmitted to a network side device on the uplink transmission resource.

Optionally, time domain information corresponding to the Sidelink Configured Grant transmission resource is a slot index of the Sidelink Configured Grant transmission resource in a resource pool.

Optionally, the period parameter is represented by a number of slots, and the number of slots is a number of slots in a resource pool or a number of candidate slots for a resource pool.

Optionally, the period parameter is represented by a number of logical slots or by a number of physical slots.

Optionally, the method further includes: sending downlink control information to a terminal, wherein the downlink control information is used for scheduling a sidelink transmission resource, the downlink control information carries the first Hybrid Automatic Repeat reQuest process ID, and the downlink control information is used for scheduling a terminal device to retransmit sidelink data corresponding to the first Hybrid Automatic Repeat reQuest process ID on the sidelink transmission resource.

Optionally, the method further includes: sending downlink control information to the terminal when a negative acknowledgement is detected on the uplink transmission resource.

Optionally, the method further includes: sending the first configuration information to the terminal device.

According to an embodiment of the present disclosure, yet another information processing method is also provided, including: receiving configuration information from a network side device, wherein the configuration information is used for an uplink transmission resource; determining time domain information corresponding to the uplink transmission resource based on configuration information; and determining a first Hybrid Automatic Repeat reQuest process ID according to the time domain information corresponding to the uplink transmission resource.

Optionally, the configuration information is further used for configuring a Sidelink Configured Grant transmission resource, and the Sidelink Configured Grant transmission resource is used for transmitting sidelink data.

Optionally, the method further includes: determining at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the method further includes: determining time domain information corresponding to the Sidelink Configured Grant transmission resource, according to and the time domain information corresponding to the uplink transmission resource and at least one of the first parameter and the second parameter, and obtaining a correspondence relationship between the uplink transmission resource and the Sidelink Configured Grant transmission resource; and determining the Sidelink Configured Grant transmission resource corresponding to the first Hybrid Automatic Repeat reQuest process ID according to the first Hybrid Automatic Repeat reQuest process ID and the correspondence relationship between the uplink transmission resource and the Sidelink Configured Grant transmission resource.

Optionally, the method further includes: transmitting first sidelink data on the Sidelink Configured Grant transmission resource, wherein the first sidelink data corresponds to the first Hybrid Automatic Repeat reQuest process ID.

Optionally, the method further includes: receiving downlink control information sent by the network side device, wherein the downlink control information is used for scheduling a sidelink transmission resource, and the downlink control information carries the first Hybrid Automatic Repeat reQuest process ID; and retransmitting the first sidelink data on the sidelink transmission resource.

Optionally, the method further includes: transmitting second sidelink data on the Sidelink Configured Grant transmission resource, wherein the second sidelink data corresponds to a second Hybrid Automatic Repeat reQuest process ID.

Optionally, the method further includes: determining a mapping relationship between the first Hybrid Automatic Repeat reQuest process ID and the second Hybrid Automatic Repeat reQuest process ID.

Optionally, the method further includes: receiving downlink control information sent by the network side device, wherein the downlink control information is used for scheduling a sidelink transmission resource, and the downlink control information carries the first Hybrid Automatic Repeat reQuest process ID; and retransmitting the second sidelink data on the sidelink transmission resource based on the mapping relationship between the first Hybrid Automatic Repeat reQuest process ID and the second Hybrid Automatic Repeat reQuest process ID.

According to an embodiment of the present disclosure, an information processing apparatus is provided, including: a first receiving module configured to receive configuration information from a network side device, wherein the configuration information is used for configuring a Sidelink Configured Grant transmission resource, and the Sidelink Configured Grant transmission resource is a transmission resource located in a resource pool; a determining module configured to determine time domain information corresponding to the Sidelink Configured Grant transmission resource based on the configuration information; and a processing module configured to determine a first Hybrid Automatic Repeat reQuest process ID according to the time domain information corresponding to the Sidelink Configured Grant transmission resource.

Optionally, the determining module is configured to determine a period parameter based on the configuration information, wherein the period parameter is a period of the Sidelink Configured Grant transmission resource; and determine the first Hybrid Automatic Repeat reQuest process ID according to the time domain information corresponding to the Sidelink Configured Grant transmission resource and the period parameter.

Optionally, the period of the Sidelink Configured Grant transmission resource is represented by a number of slots and used for describing a number of slots in a resource pool.

Optionally, time domain information corresponding to the Sidelink Configured Grant transmission resource is a slot index of the Sidelink Configured Grant transmission resource in the resource pool.

Optionally, the apparatus further includes: a first transmission module configured to transmit first sidelink data on the Sidelink Configured Grant resource, wherein the first sidelink data corresponds to the first Hybrid Automatic Repeat reQuest process ID.

Optionally, the apparatus further includes: a second receiving module configured to receive downlink control information from a network side device, wherein the downlink control information is used for scheduling a sidelink transmission resource, and the downlink control information carries the first Hybrid Automatic Repeat reQuest process ID; and a first retransmission module configured to retransmit the first sidelink data on the sidelink transmission resource scheduled by the downlink control information.

Optionally, the apparatus further includes: a second transmission module configured to transmit second sidelink data on the Sidelink Configured Grant transmission resource based on a mapping relationship between the first Hybrid Automatic Repeat reQuest process ID and a second Hybrid Automatic Repeat reQuest process ID, wherein the second sidelink data corresponds to the second Hybrid Automatic Repeat reQuest process ID.

Optionally, the apparatus further includes: a third receiving module configured to receive downlink control information from a network side device, wherein the downlink control information is used for scheduling a sidelink transmission resource, and the downlink control information carries the first Hybrid Automatic Repeat reQuest process ID; and a second retransmission module configured to retransmit the second sidelink data on the sidelink transmission resource scheduled by the downlink control information.

According to an embodiment of the present disclosure, another information processing apparatus is also provided, including: a processing module configured to determine first configuration information, wherein the first configuration information is used for configuring a Sidelink Configured Grant transmission resource, and the Sidelink Configured Grant transmission resource is a transmission resource located in a resource pool; a first determining module configured to determine time domain information corresponding to the Sidelink Configured Grant transmission resource based on the first configuration information; and a second determining module configured to determine a first Hybrid Automatic Repeat reQuest process ID according to the time domain information corresponding to the Sidelink Configured Grant transmission resource.

Optionally, the second determining module is configured to determine a period parameter based on the first configuration information, wherein the period parameter is a period of the Sidelink Configured Grant transmission resource; and determine the first Hybrid Automatic Repeat reQuest process ID according to the time domain information corresponding to the Sidelink Configured Grant transmission resource and the period parameter.

Optionally, the period of the Sidelink Configured Grant transmission resources is represented by a number of slots.

Optionally, the time domain information corresponding to the Sidelink Configured Grant transmission resource is a slot index of the Sidelink Configured Grant transmission resource in the resource pool.

Optionally, the first determining module is configured to receive an uplink control channel sent by a terminal on an uplink transmission resource based on the first configuration information, wherein the uplink transmission resource and the Sidelink Configured Grant transmission resource belong to a same Sidelink Configured Grant period, and the uplink control channel is used for the terminal to report sidelink feedback information; and determine the time domain information corresponding to the Sidelink Configured Grant transmission resource according to time domain information of the uplink transmission resource.

Optionally, the apparatus further includes: a third determining module configured to determine at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the first determining module is further configured to determine the time domain information corresponding to the Sidelink Configured Grant transmission resource, according to the time domain information of the uplink transmission resource and at least one of the first parameter and the second parameter.

Optionally, the first configuration information is further used for configuring at least one of the uplink transmission resource and the first parameter.

Optionally, the apparatus further includes: a first sending module configured to send second configuration information to the terminal, wherein the second configuration information is used for configuring a resource pool; and a fourth determining module configured to determine the second parameter according to the second configuration information.

Optionally, the apparatus further includes: a second sending module configured to send downlink control information to the terminal when an uplink control channel carries non-acknowledgement information, wherein the downlink control information is used for scheduling a sidelink transmission resource, the downlink control information carries the first Hybrid Automatic Repeat reQuest process ID, and the downlink control information is used for scheduling the terminal to retransmit sidelink data corresponding to the first Hybrid Automatic Repeat reQuest process ID on the sidelink transmission resource.

Optionally, the apparatus further includes: a third sending module configured to send first configuration information to the terminal, wherein the first configuration information is further used for the terminal to determine the time domain information corresponding to the Sidelink Configured Grant transmission resource and to determine the first Hybrid Automatic Repeat reQuest process ID according to the time domain information corresponding to the Sidelink Configured Grant transmission resource.

According to an embodiment of the present disclosure, another information processing apparatus is also provided, including: a first determining module configured to determine first configuration information, wherein the first configuration information is used for configuring an uplink transmission resource; a second determining module configured to determine time domain information corresponding to the uplink transmission resource based on the first configuration information; and a processing module configured to determine a first Hybrid Automatic Repeat reQuest process ID according to the time domain information corresponding to the uplink transmission resource.

Optionally, the apparatus further includes: a third determining module configured to determine a period parameter based on the first configuration information, wherein the first configuration information is further used for configuring a Sidelink Configured Grant transmission resource, the Sidelink Configured Grant transmission resource is used for transmitting sidelink data, and the period parameter is used for determining a period of the Sidelink Configured Grant transmission resource; and a fourth determining module configured to determine the first Hybrid Automatic Repeat reQuest process ID according to the time domain information corresponding to the uplink transmission resource and the period parameter. Herein, the Sidelink Configured Grant transmission resource and the uplink transmission resource are associated, that is, sidelink feedback information corresponding to the sidelink data transmitted on the Sidelink Configured Grant transmission resource is transmitted to a network side device on the uplink transmission resource.

Optionally, time domain information corresponding to the Sidelink Configured Grant transmission resource is a slot index of the Sidelink Configured Grant transmission resource in a resource pool.

Optionally, the period parameter is represented by a number of slots, and the number of slots is a number of slots in a resource pool or a number of candidate slots for a resource pool.

Optionally, the apparatus further includes: a first sending module configured to send downlink control information to a terminal, wherein the downlink control information is used for scheduling a sidelink transmission resource, the downlink control information carries the first Hybrid Automatic Repeat reQuest process ID, and the downlink control information is used for scheduling a terminal device to retransmit sidelink data corresponding to the first Hybrid Automatic Repeat reQuest process ID on the sidelink transmission resource.

Optionally, the apparatus further includes: a second sending module configured to send downlink control information to the terminal when a negative acknowledgement is detected on the uplink transmission resource.

Optionally, the apparatus further includes: a third sending module configured to send the first configuration information to the terminal device.

According to an embodiment of the present disclosure, yet another information processing apparatus is provided, including: a first receiving module configured to receive configuration information from a network side device, wherein the configuration information is used for an uplink transmission resource; a first determining module configured to determine time domain information corresponding to the uplink transmission resource based on the configuration information; and a second determining module configured to determine a first Hybrid Automatic Repeat reQuest process ID according to the time domain information corresponding to the uplink transmission resource.

Optionally, the configuration information is further used for configuring a Sidelink Configured Grant transmission resource, and the Sidelink Configured Grant transmission resource is used for transmitting sidelink data.

Optionally, the apparatus further includes: a third determining module configured to determine at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the apparatus further includes: a fourth determining module configured to determine time domain information corresponding to the Sidelink Configured Grant transmission resource according to the time domain information corresponding to the uplink transmission resource and at least one of the first parameter and the second parameter, and obtain a correspondence relationship between the uplink transmission resource and the Sidelink Configured Grant transmission resource; and determine a Sidelink Configured Grant transmission resource corresponding to the first Hybrid Automatic Repeat reQuest process ID according to the first Hybrid Automatic Repeat reQuest process ID and the correspondence relationship between the uplink transmission resource and the Sidelink Configured Grant transmission resource.

Optionally, the apparatus further includes: a first transmission module configured to transmit first sidelink data on the Sidelink Configured Grant transmission resource, wherein the first sidelink data corresponds to the first Hybrid Automatic Repeat reQuest process ID.

Optionally, the apparatus further includes: a second receiving module configured to receive downlink control information sent by a network side device, wherein the downlink control information is used for scheduling a sidelink transmission resource, and the downlink control information carries the first Hybrid Automatic Repeat reQuest process ID; and a first retransmission module configured to retransmit the first sidelink data on the sidelink transmission resource.

Optionally, the apparatus further includes: a second transmission module configured to transmit second sidelink data on a Sidelink Configured Grant transmission resource, wherein the second sidelink data corresponds to a second Hybrid Automatic Repeat reQuest process ID.

Optionally, the apparatus further includes: a third determining module configured to determine a mapping relationship between the first Hybrid Automatic Repeat reQuest process ID and the second Hybrid Automatic Repeat reQuest process ID.

Optionally, the apparatus further includes: a third receiving module configured to receive downlink control information sent by a network side device, wherein the downlink control information is used for scheduling a sidelink transmission resource, and the downlink control information carries the first Hybrid Automatic Repeat reQuest process ID; and a second retransmission module configured to retransmit the second sidelink data on the sidelink transmission resource based on the mapping relationship between the first Hybrid Automatic Repeat reQuest process ID and the second Hybrid Automatic Repeat reQuest process ID.

According to an embodiment of the present disclosure, there is also provided a storage medium in which a computer program is stored, wherein the computer program is configured to perform the information processing method in any one of the above when the computer program is run According to an embodiment of the present disclosure, there is also provided a processor configured to run a program, wherein the program is configured to perform the information processing method in any one of the above when the program is run.

According to an embodiment of the present disclosure, an electronic apparatus is also provided, comprising a memory in which a computer program is stored, and a processor, wherein the processor is configured to run the computer program to perform the information processing method in any one of the above.

According to an embodiment of the present disclosure, a chip is also provided, including a processor, configured to invoke and run a computer program from a memory to enable a device installed with the chip to perform the information processing method in any one of the above.

According to an embodiment of the present disclosure, a computer program product is also provided, including computer program instructions that enable a computer to perform the information processing method in any one of the above.

According to an embodiment of the present disclosure, there is also provided a computer program that enables a computer to perform the information processing method in any one of the above.

In at least some embodiments of the present disclosure, configuration information from a network side device is received, wherein the configuration information is used for configuring a Sidelink Configured Grant transmission resource and the Sidelink Configured Grant transmission resource is a transmission resource located in a resource pool, time domain information corresponding to the Sidelink Configured Grant transmission resource is determined through the configuration information and a first Hybrid Automatic Repeat reQuest process ID is determined according to the time domain information corresponding to the Sidelink Configured Grant transmission resource, thereby a purpose of providing a method for determining a HARQ process ID for Sidelink Configured Grant is achieved. Thus, the following technical effects are achieved: a technical blank that a HARQ process ID cannot be determined in an aspect of Sidelink Configured Grant is effectively filled; flexibility and diversity of a method for determining a HARQ process ID are increased, and a technical problem of lack of a method for determining a HARQ process ID for Sidelink Configured Grant in the related art is solved.

BRIEF DESCRIPTION OF DRAWINGS

Accompanying drawings described herein are used for providing further understanding of the present disclosure and form a part of the present disclosure. Exemplary embodiments of the present disclosure and the description thereof are used for explaining the present disclosure and do not construct an improper limitation on the present disclosure. In the accompanying drawings, there are following drawings.

DETAILED DESCRIPTION

In order to make one skilled in the art better understand solutions of the present disclosure, technical solutions in embodiments of the present disclosure will be described clearly and completely below with reference to the drawings in the embodiments of the present disclosure. Apparently, the described embodiments are only a part, but not all, of the embodiments of the present disclosure. Based on the embodiments of the present disclosure, all other embodiments obtained by one ordinary skilled in the art without paying an inventive effort shall belong to the protection scope of the present disclosure.

It should be noted that terms "first", "second", or the like in the specification, claims, and drawings of the present disclosure are used for distinguishing between similar objects, and are not necessarily used for describing a particular order or an order of precedence. It should be understood that data used in this way may be interchanged under appropriate circumstances such that the embodiments of the present disclosure described herein can be implemented in orders other than those illustrated or described herein. In addition, terms "including", "having", and any variations of them, are intended to cover non-exclusive inclusion, for example, processes, methods, systems, products, or devices that include a series of acts or units are not necessarily limited to those acts or units clearly listed, but may include other acts or units that are not clearly listed or inherent to these processes, methods, products, or devices.

Figure 1:
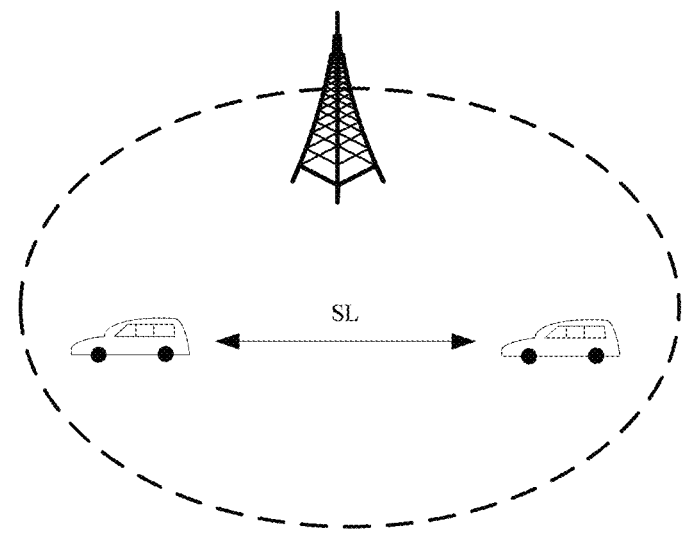
FIG. 1 is a schematic diagram of a Device to Device (D2D) transmission technology according to the related art.

FIG. 1 is a schematic diagram of a D2D transmission technology according to the related art. As shown in FIG. 1, Device to Device (D2D for short) communication is a Sidelink (SL for short) based transmission technology, which is different from a way of receiving or sending communication data through a base station in a traditional cellular system. Since a direct communication way of terminal-to-terminal is adopted in a D2D system, the D2D system has a higher spectral efficiency and a lower transmission latency. Based on a D2D transmission technology, two transmission modes, i.e., mode A and mode B, are defined for the Internet of Vehicles system in the Third Generation Partnership Project (3GPP).

A transmission resource of a terminal is allocated by a base station in the mode A. The terminal transmits data on a sidelink according to a resource allocated by the base station. The base station may allocate a resource for single transmission, for the terminal, or may allocate a resource for semi-static transmission for the terminal. In the mode B, a terminal selects one resource in a resource pool for data transmission.

Since autonomous driving needs to be supported in NR-Vehicle to Everything (V2X), higher requirements are put forward for data interaction between vehicles, such as a better throughput, a lower latency, a higher reliability, a larger coverage range, and a more flexible resource allocation. In NR-V2X, unicast and multicast transmission modes are introduced. In addition, in Long Term Evolution (LTE)-V2X, a broadcast transmission mode is also supported.

Figure 2:
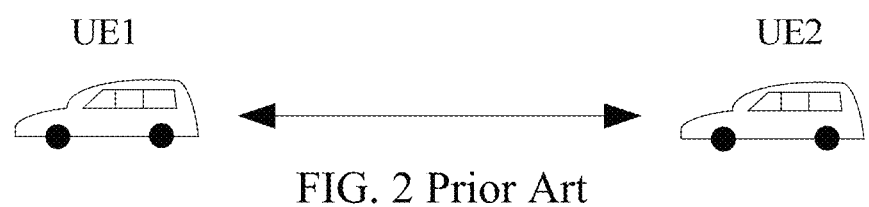
FIG. 2 is a schematic diagram of a unicast transmission mode according to the related art.

For the unicast transmission mode, unicast transmission is performed between a sending side terminal and a receiving side terminal. FIG. 2 is a schematic diagram of a unicast transmission mode according to the related art. As shown in FIG. 2, UE1 is a sending side terminal and UE2 is a receiving side terminal, so that unicast transmission may be performed between UE1 and UE2.

Figure 3:
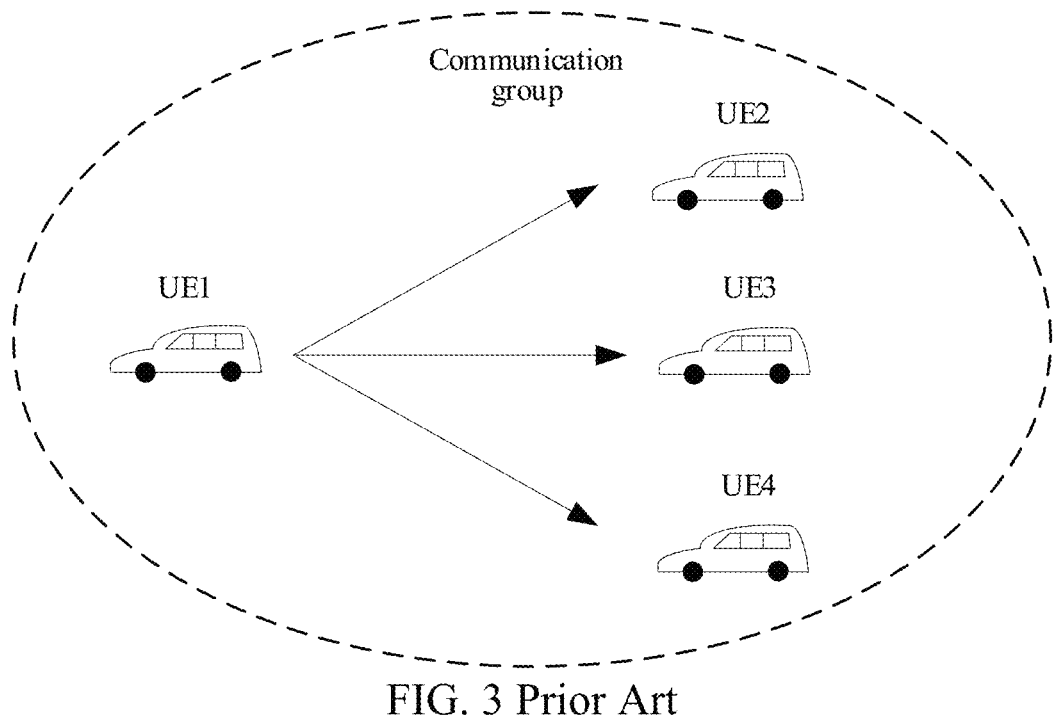
FIG. 3 is a schematic diagram of a multicast transmission mode according to the related art.

For the multicast transmission mode, a receiving side terminal includes all terminals in a communication group or all terminals within a certain transmission distance. FIG. 3 is a schematic diagram of a multicast transmission mode according to the related art. As shown in FIG. 3, UE1, UE2, UE3, and UE4 constitute a communication group, wherein UE1 is a data sender, and other terminal devices UE2, UE3, and UE4 in the group are all receiving side terminals.

Figure 4:
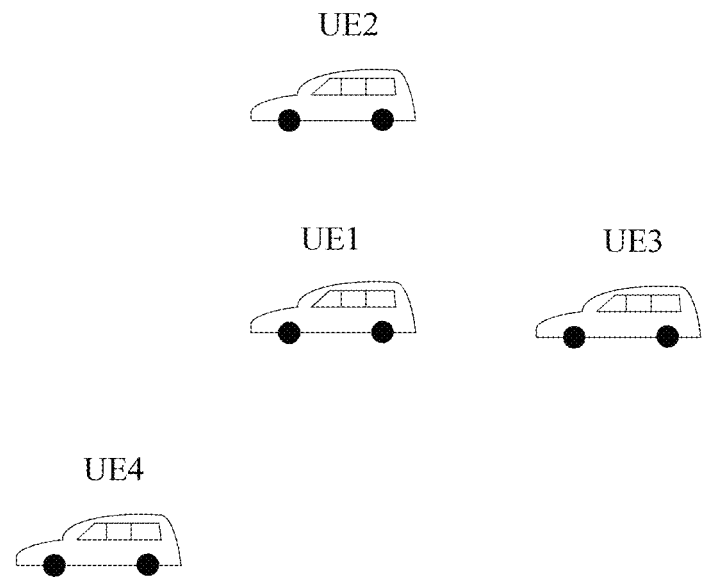
FIG. 4 is a schematic diagram of a broadcast transmission mode according to the related art.

For a broadcast transmission mode, a receiving side terminal may be any terminal. FIG. 4 is a schematic diagram of a broadcast transmission mode according to the related art. As shown in FIG. 4, if UE1 is a sending side terminal, all of other terminals UE2, UE3, and UE4 around the UE1 may be set as receiving side terminals.

Figure 5:
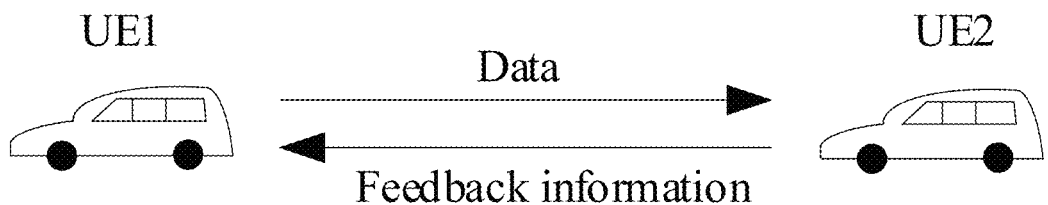
FIG. 5 is a schematic diagram of a data transmission process in New Radio (NR)-Vehicle to Everything (V2X) according to the related art.

In addition, in NR-V2X, a variety of transmission modes are introduced, that is, mode 1 and mode 2. In the mode 1 (that is, the above mode A), a network allocates a transmission resource to a terminal, and in the mode 2 (that is, the mode B above), a terminal selects a transmission resource. In order to improve reliability of data transmission, a feedback channel is introduced on a sidelink. FIG. 5 is a schematic diagram of a data transmission process in NR-V2X according to the related art. As shown in FIG. 5, UE1 and UE2 constitute a unicast link. The UE1 sends sidelink data to the UE2. The UE2 sends sidelink feedback information, i.e., a HARQ Acknowledgement (ACK) or Negative Acknowledgement (NACK), to the UE1 according to a detection result of the received sidelink data. After receiving the feedback information from the UE2, the UE1 decides whether to retransmit the data to the UE2. In addition, the UE1 may also decide whether the receiving side terminal UE2 needs to send the feedback information. For example, for broadcast communication, a receiving end does not need to feedback, but for unicast communication, the receiving end needs to feedback to improve reliability of a system. Specifically, the UE1 carries indication information in Sidelink Control Information (SCI) to indicate whether a receiving side terminal needs to perform sidelink feedback.

In NR-V2X, resource allocation modes of the mode 1 and the mode 2 are also supported. In the mode 2, a terminal selects a transmission resource autonomously in a resource pool for sidelink transmission, that is, the above-mentioned mode B. In the mode 1, a network side device allocates a Sidelink Configured Grant transmission resource to a terminal, that is, the above-mentioned mode A. Specifically the network side device may allocate a Sidelink Configured Grant transmission resource to the terminal by means of Dynamic Scheduling, and may also allocate an SL CG transmission resource to the terminal. For a CG resource allocation mode, there are mainly two Configured Grant modes: a first type of Configured Grant (type-1 Configured Grant) and a second type of Configured Grant (type-2 Configured Grant).

The type-1 Configured Grant means that a network side device configures a Sidelink Configured Grant transmission resource for a terminal through a Radio Resource Control (RRC) signaling. All transmission resources and transmission parameters including a time domain resource, a frequency domain resource, a Demodulation Reference Signal (DMRS), and a Modulation Coding Scheme (MCS), etc., are configured through the RRC signaling. Then, the terminal performs sidelink transmission on configured time-frequency resources using the configured transmission parameters.

The type-2 Configured Grant adopts a two-step resource allocation mode, that is, a mode of RRC+Downlink Control Information (DCI for short). Firstly, transmission resources and transmission parameters including a period of time-frequency resources, and a number of HARQ processes, etc., are configured through an RRC signaling, and then transmission of the type-2 Configured Grant is activated through DCI, and simultaneously other transmission resources and transmission parameters including a time domain resource, a frequency domain resource, and an MCS, etc., are configured. After receiving an RRC signaling, a User Equipment (UE) cannot immediately use a resource and a parameter configured through this high-layer parameter for sidelink transmission. However, the UE further needs to receive corresponding DCI to activate and configure other transmission resources and transmission parameters before it can perform sidelink transmission. In addition, a network side device may deactivate transmission of the configuration through DCI. When a terminal receives DCI for deactivation, it can no longer use the transmission resource for sidelink transmission.

Figure 6:
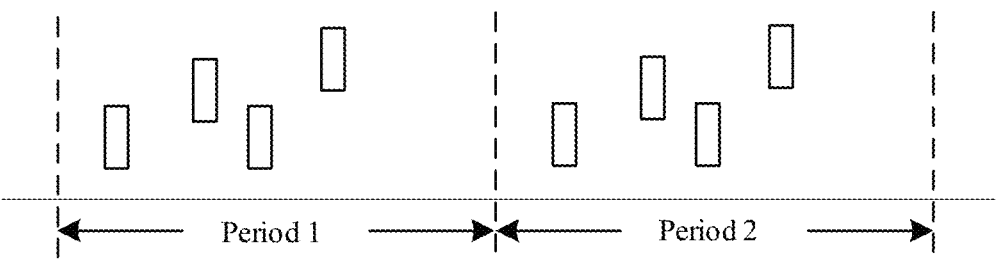
FIG. 6 is a schematic diagram of configuring a transmission resource by a network side device according to the related art.

If the network side device has allocated a transmission resource of Configured Grant to the terminal, when the terminal has sidelink data to be transmitted, the terminal may directly use the transmission resource for transmission without sending a Scheduling Request (SR) or a Buffer Status Report (BSR) to the network side device to request a transmission resource, thereby reducing transmission latency. In Sidelink Configured Grant, the network side device allocates periodic transmission resources, and in each period, the network side device may configure multiple transmission resources. FIG. 6 is a schematic diagram of configuring a transmission resource by a network side device according to the related art. As shown in FIG. 6, Configured Grant transmission resources of the network side device are periodically repeated transmission resources, wherein four Sidelink Configured Grant transmission resources are included in each period.

In a resource allocation mode of the mode 1, if sidelink feedback is in an active state, a receiving side terminal will send feedback information to a sending side terminal according to a reception condition of sidelink data. The sending side terminal reports Sidelink feedback information (SL HARQ-ACK/NACK) to the network side device. Then, the network side device decides whether a retransmission resource needs to be allocated according to the SL HARQ-ACK/NACK reported by the sending side terminal.

In Sidelink Configured Grant transmission, a network side device may configure a Sidelink Configured Grant transmission resource for a terminal and allocate a transmission resource of a Physical Uplink Control Channel (PUCCH). The terminal may report sidelink feedback information to the network side device on the PUCCH. If the network side device receives NACK feedback information reported by the terminal, a retransmission resource will be allocated through dynamic scheduling, and a HARQ process identity (ID) needs to be indicated in dynamically scheduled DCI, to indicate a HARQ process to which the retransmission resource allocated for the terminal belongs. Therefore, the network side device needs to determine a HARQ process ID corresponding to sidelink transmission.

Technical solutions of the embodiments of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Exemplarily, a communication system to which the embodiments of the present disclosure are applied may include a network side device which may be a device communicating with a terminal device (or called a communication terminal or a terminal). The network side device may provide communication coverage for a specific geographical region, and may communicate with a terminal device located within a region of the coverage. Optionally, the network side device may be a Base Transceiver Station (BTS for short) in a GSM system or CDMA system, or a NodeB (NB for short) in a WCDMA system, or an Evolutional Node B (eNB or eNodeB for short) in an LTE system, or a radio controller in a Cloud Radio Access Network (CRAN for short). Or the network side device may be a mobile switching center, a relay station, an access point, a vehicle-mounted device, a wearable device, a hub, a switch, a bridge, a router, a network side device in a 5G network, or a network side device in a future evolved Public Land Mobile Network (PLMN), etc.

The communication system further includes at least one terminal device located within a coverage range of the network side device. The "terminal device" as used herein includes, but is not limited to, an apparatus configured to receive/send communication signals via a connection of a wired line, for example, via a connection of a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast sender; and/or another terminal device, and/or an Internet of Things (IoT for short) device. A terminal device configured to communicate via a wireless interface may be referred to as "a wireless communication terminal", "a wireless terminal", or "a mobile terminal". Examples of the mobile terminal include, but are not limited to, a satellite or cellular telephone; a Personal Communication System (PCS) terminal capable of combining a cellular radio telephone with data processing, faxing, and data communication capabilities; a Personal Digital Assistant (PDA) that may include a radio telephone, a pager, an internet/intranet access, a Web browser, a memo pad, a calendar, and/or a Global Positioning System (GPS) receiver; and a conventional laptop and/or palmtop receiver, or another electronic apparatus including a radio telephone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP for short) phone, a Wireless Local Loop (WLL for short) station, a Personal Digital Assistant (PDA), a handheld device with a wireless communication function, a computing device or another processing device connected to a wireless modem, a vehicle-mounted device, a wearable device, a terminal device in a 5G network, or a terminal device in a future evolved PLMN, etc.

Optionally, Device to Device (D2D) communication may be performed between terminal devices.

Optionally, a 5G system or a 5G network may also be referred to as an NR system or an NR network.

Optionally, the communication system may also include other network entities such as a network controller and a mobile management entity, which is not limited in the embodiments of the present disclosure.

It should be understood that a device with a communication function in a network/system in an embodiment of the present disclosure may be referred to as a communication device. The communication device may include a network side device and a terminal device which have communication functions, and the network side device and the terminal device may be specific devices described above, which will not be repeated here. The communication device may also include another device in the communication system, for example, another network entity such as a network controller and a mobile management entity, which is not limited in the embodiments of the present disclosure.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B, and B alone. In addition, the symbol "/" herein generally indicates that objects before and after the symbol "/" have an "or" relationship.

According to an embodiment of the present disclosure, an embodiment of an information processing method is provided. It should be noted that acts illustrated in a flowchart of the drawings may be performed such as in a computer system having a set of computer-executable instructions, and although a logical order is shown in the flowchart, acts shown or described may be performed in a different order from that here, in some cases.

Figure 7:
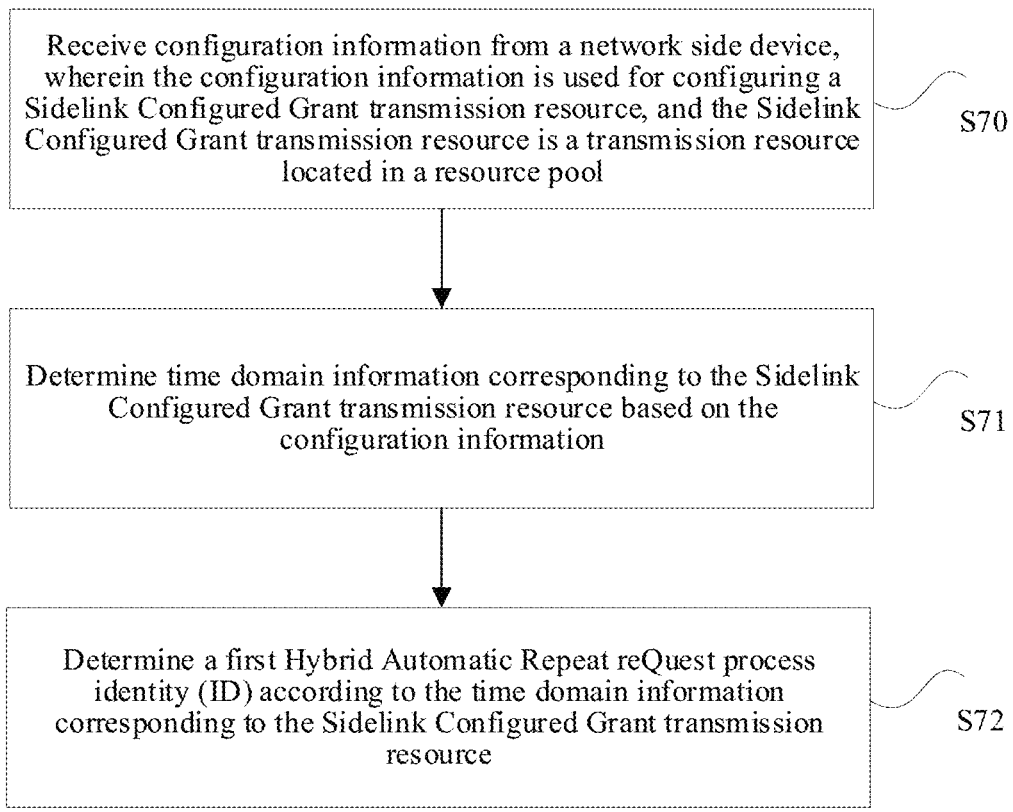
FIG. 7 is a flowchart of an information processing method according to an embodiment of the present disclosure.

In an embodiment, an information processing method on the terminal device is provided. FIG. 7 is a flowchart of an information processing method according to an embodiment of the present disclosure. As shown in FIG. 7, the method includes the following acts.

In act S70, configuration information is received from a network side device, wherein the configuration information is used for configuring a Sidelink Configured Grant transmission resource, and the Sidelink Configured Grant transmission resource is a transmission resource located in a resource pool.

In act S71, time domain information corresponding to the Sidelink Configured Grant transmission resource is determined based on the configuration information.

In act S72, a first Hybrid Automatic Repeat reQuest process ID is determined according to the time domain information corresponding to the Sidelink Configured Grant transmission resource.

With the above acts, configuration information from a network side device may be received, wherein the configuration information is used for configuring a Sidelink Configured Grant transmission resource and the Sidelink Configured Grant transmission resource is a transmission resource located in a resource pool, time domain information corresponding to the Sidelink Configured Grant transmission resource is determined through the configuration information, and a first Hybrid Automatic Repeat reQuest process ID is determined according to the time domain information corresponding to the Sidelink Configured Grant transmission resource, thereby a purpose of providing a method for determining a HARQ process ID for Sidelink Configured Grant is achieved. Thus, the following technical effects are achieved: a technical blank that a HARQ process ID cannot be determined in an aspect of Sidelink Configured Grant is effectively filled; flexibility and diversity of a method for determining a HARQ process ID are increased, and a technical problem of lack of a method for determining a HARQ process ID for Sidelink Configured Grant in the related art is solved.

In the configuration information, not only a Sidelink Configured Grant transmission resource may be configured, but also a PUCCH transmission resource may be configured. Herein, the PUCCH transmission resource is a PUCCH resource corresponding to the Sidelink Configured Grant transmission resource, i.e., sidelink feedback information associated with sidelink data transmitted on the Sidelink Configured Grant transmission resource is reported to the network side device through the PUCCH transmission resource. For the terminal device, the first Hybrid Automatic Repeat reQuest process ID may be determined according to a time domain position of the Sidelink Configured Grant transmission resource.

Figure 8:
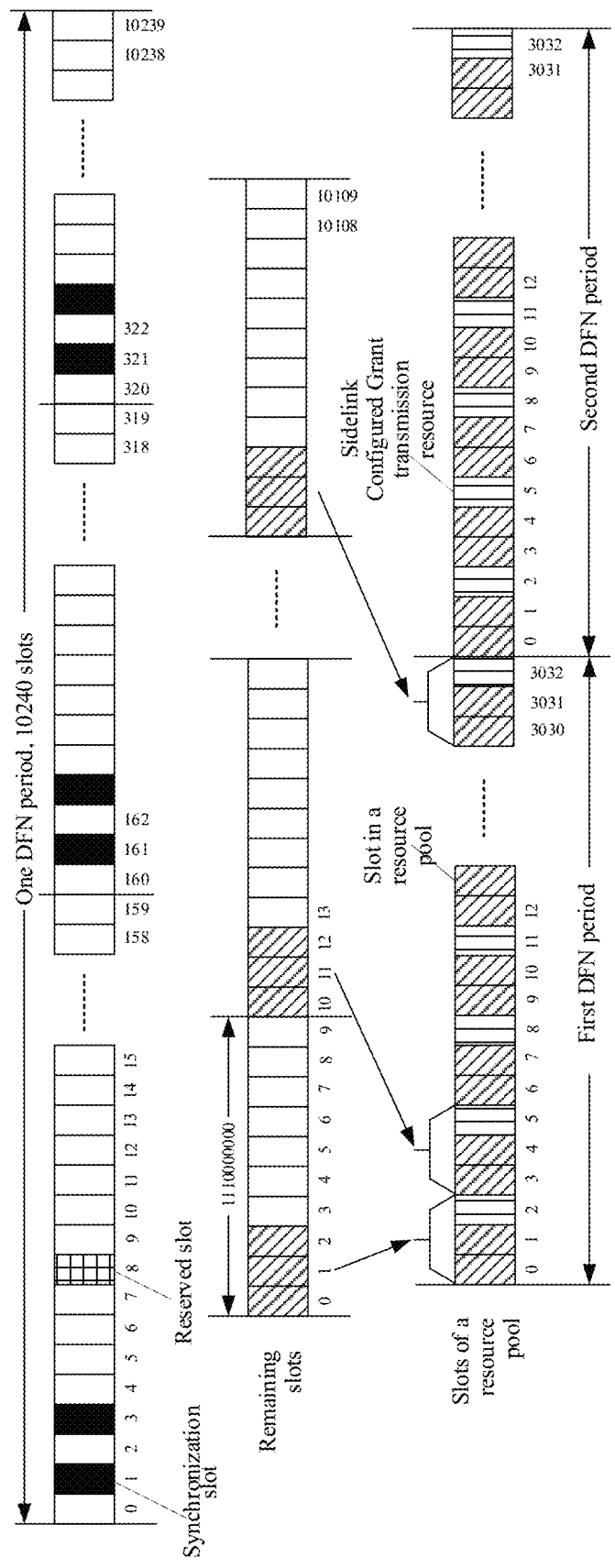
FIG. 8 is a schematic diagram of determining a resource pool according to an optional embodiment of the present disclosure.

The resource pool may be one of multiple resource pools. Specifically, FIG. 8 is a schematic diagram of determining a resource pool according to an optional embodiment of the present disclosure. As shown in FIG. 8, the resource pool is determined within a period of a System Frame Number (SFN) or Direct Frame Number (DFN) in the following manner. Taking a Subcarrier spacing of 15 kHz as an example, a DFN period includes 10240 subframes (or slots) corresponding to subframes 0, 1, 2, . . . , and 10239 respectively. Subframes that cannot be used for sidelink transmission, such as a synchronization subframe, a downlink subframe, a special subframe (i.e. a downlink subframe and a special subframe in a TDD system), and a reserved subframe, are removed, and numbers of remaining subframes are $(t_0^{SL}, t_1^{SL}, \ldots, t_{T_{max}}^{SL})$. A number of these remaining subframes may be divided by $L_{bitmap}$ with no remainder. A bitmap $(b_0, b_1, \ldots, b_{L_{bitmap}-1})$ is repeated periodically in the remaining subframes, where a bit being 1 indicates that a subframe, in the remaining subframes, corresponding to the bit belongs to the resource pool, otherwise it does not belong to the resource pool.

A DEN period includes 10240 subframes, and a period of a synchronization signal is 160 ms. Assuming that two synchronization subframes are included in one synchronization period, therefore, there are 128 synchronization subframes in one DFN period, and a length of a bitmap for indicating time domain resources of a resource pool is 10 bits. Thereby, two reserved subframes are required, and a number of remaining subframes is (10240-128-2=10110), which may be divided by the length of a bitmap, i.e., 10, with no remainder, thus the remaining subframes are renumbered as 0, 1, 2, . . . , and 10109. First three bits of the bitmap are 1 and remaining seven bits are 0. That is, in the remaining subframes, first three subframes in every 10 subframes belong to the resource pool, and remaining subframes do not belong to the resource pool. Since the bitmap is required to be repeated 1011 times in the remaining subframes to indicate whether all subframes belong to the resource pool, and 3 subframes are included in each bitmap period, a total of 3033 subframes belong to the resource pool in one DFN period. Each slot index in the resource pool corresponds to one slot index in the DFN period. For example, slots 0, 1, 2, 3, 4, and 5 in the resource pool correspond to slots 0, 2, 4, 13, 14, and 15 in the DFN period, respectively. A Sidelink Configured Grant transmission resource configured by a network will be associated with one resource pool, and the Sidelink Configured Grant transmission resource configured by the network is a transmission resource located in the one resource pool.

In the embodiment, time domain information corresponding to a Sidelink Configured Grant transmission resource is a slot index of the Sidelink Configured Grant transmission resource in a resource pool. For example, for the above embodiment, the resource pool where the Sidelink Configured Grant transmission resource is located includes 3033 subframes, so time domain information corresponding to the Sidelink Configured Grant transmission resource is a slot index in the resource pool, that is, a slot index in a range of [0, 3032].

Optionally, the time domain information corresponding to the Sidelink Configured Grant transmission resource is an index of a slot in slots that are possibly used for the resource pool. For example, for the above embodiment, a set of slots that are possibly used for the resource pool is the remaining subframes of which a corresponding slot index range is [0, 10109].

Optionally, at least one of following parameters may be determined through the above configuration information: (1) a period of a Sidelink Configured Grant transmission resource; (2) a total number of HARQ process IDs corresponding to current Configured Grant; (3) a HARQ process ID offset which is used for determining a first HARQ process ID corresponding to the current Configured Grant; (4) a slot corresponding to a time domain resource of a Sidelink Configured Grant transmission resource.

In one implementation, the configuration information includes slot offset indication information and a period parameter, and a Sidelink Configured Grant transmission resource is determined according to the slot offset indication information and the period parameter; wherein, the slot offset indication information is used for determining time domain information of a first Sidelink Configured Grant transmission resource in a period of a system frame number (or in a period of a direct frame number). The slot offset indication information is represented by a number of slots, and the number of slots represents a number of physical slots or a number of logical slots, wherein the logical slots are slots in a resource pool associated with the Configured Grant transmission resource or slots that are possibly used for a resource pool. The period parameter is used for determining a period of a Sidelink Configured Grant transmission resource which is represented by a number of slots. The number of slots represents a number of physical slots or a number of logical slots, wherein the logical slots are slots in a resource pool associated with the Configured Grant transmission resource or slots that are possibly used for a resource pool.

Optionally, in act S72, the first Hybrid Automatic Repeat reQuest process ID is determined according to the time domain information corresponding to the Sidelink Configured Grant transmission resource, which may include the following execution acts S720 and S722.

In act S720, a period parameter is determined based on the configuration information, wherein the period parameter is a period of the Sidelink Configured Grant transmission resource.

In act S722, the first Hybrid Automatic Repeat reQuest process ID is determined according to the time domain information corresponding to the Sidelink Configured Grant transmission resource and the period parameter.

Optionally, the period of the Sidelink Configured Grant transmission resource is represented by a number of slots, which is used for describing a number of slots in a resource pool where the Sidelink Configured Grant transmission resource is located. Optionally, the period of the Sidelink Configured Grant transmission resource is represented by a number of slots to describe a number of candidate slots for a resource pool.

Optionally, the period of the Sidelink Configured Grant transmission resources is represented by a number of logical slots or by a number of physical slots.

If the parameter periodicity is represented by a number of slots, a corresponding first HARQ process ID is determined through the following formula according to a time domain position of the Sidelink Configured Grant transmission resource in a resource pool where the Sidelink Configured Grant is located.

$$\text{HARQ Process ID} = [\text{floor}(\text{CURRENT\_slot}/\text{periodicity})] \bmod \text{nrofHARQ-Processes} + \text{harq-procID-offset}$$

Herein, meanings of various parameters in this formula are as follows.

(1) CURRENT_slot represents a slot corresponding to a time domain resource of a Sidelink Configured Grant transmission resource, and an index of the slot is an index of a slot in a resource pool where Sidelink Configured Grant is located; a value range of this parameter is [0, N−1], N represents a total number of slots contained in a current resource pool, and the index of the slot is an index of a slot in the resource pool where the Sidelink Configured Grant is located.

(2) periodicity represents a period of the Sidelink Configured Grant transmission resource, which is represented by slots; further, it represents a number of slots in the resource pool where the Sidelink Configured Grant is located.

(3) nrofHARQ-Processes represents a total number of HARQ process IDs corresponding to the Sidelink Configured Grant.

(4) harq-procID-offset is used for determining a first HARQ process ID corresponding to the Sidelink Configured Grant; optionally, if a network side device does not configure this parameter, a value of this parameter is 0.

In the above formula, mod represents a modulo operation, and floor represents a downward rounding operation.

Still as shown in FIG. 8, a network side device configures a transmission resource of Sidelink Configured Grant in a resource pool. Three slots of a period of the Sidelink Configured Grant represent three slots in the resource pool. A first slot position of the Sidelink Configured Grant is slot 2. According to the period of the Sidelink Configured Grant, slots such as slot 5, slot 8, and slot 11, etc. will include the transmission resource of the Sidelink Configured Grant.

In the above formula for calculating a HARQ process ID, CURRENT_slot represents a slot where the transmission resource of the Sidelink Configured Grant in the resource pool is located, namely, slot 2, slot 5, slot 8, slot 11, slot 14, slot 17, . . . , and slot 3032, etc. Parameter periodicity represents a period of the transmission resource of the Sidelink Configured Grant, which may be represented by a number of slots in a resource pool where the Configured Grant is located, that is, the period is 3 slots. If nrofHARQ-Processes=4 and harq-procID-offset-0 are configured, HARQ process IDs corresponding to the Sidelink Configured Grant are 0, 1, 2, and 3, respectively. In this embodiment, HARQ process IDs corresponding to transmission resources of the Sidelink Configured Grant at time domain positions such as slot 2, slot 5, slot 8, slot 11, slot 14, and slot 17, etc. are respectively 0, 1, 2, 3, 0, and 1, etc.

In a process of determining the first Hybrid Automatic Repeat reQuest process ID according to the time domain information corresponding to the Sidelink Configured Grant transmission resource, the network side device configures the Sidelink Configured Grant transmission resource for the terminal. According to a time domain position of the Sidelink Configured Grant transmission resource on a Sidelink, the corresponding first HARQ process ID may also be determined through the following formula.

$$\text{HARQ Process ID} = [\text{floor}(\text{CURRENT\_slot} \times 10/(\text{numberOfSlotsPerFrame} \times \text{periodicity}))] \bmod \text{nrofHARQ-Processes} + \text{harq-procID-offset}$$

Herein, meanings of various parameters in the above formula are as follows.

(1) numberOfSlotsPerFrame represents a number of slots contained in each radio frame (frame or radio frame).

(2) periodicity represents a period of a Sidelink Configured Grant transmission resource, and is represented in millisecond (ms).

(3) nrofHARQ-Processes represents a total number of HARQ process IDs corresponding to current Sidelink Configured Grant.

(4) harq-procID-offset is used for determining a first HARQ process ID corresponding to the current Sidelink Configured Grant; in an optional embodiment, a value of this parameter is 0 if the network side device does not configure this parameter.

CURRENT_slot represents a slot corresponding to a time domain resource of a Sidelink Configured Grant transmission resource, a value range of this parameter is [0, N−1], N represents a total number of slots contained in a current resource pool, and an index of the slot is an index of a slot in a resource pool where Sidelink Configured Grant is located.

In an optional embodiment, CURRENT_slot [(DFN× numberOfSlotsPerFrame)+slot number in the frame]; where slot number in the frame represents an index of a Sidelink Configured Grant transmission resource in a radio frame, and its value range is [0, M−1], and M represents a total number of slots included in a radio frame; DFN represents a Direct Frame Number; numberOfSlotsPerFrame represents a number of slots contained in each radio frame (frame or radio frame), which is determined by a Subcarrier spacing of a Sidelink carrier on which Sidelink transmission is located, or determined by an uplink Subcarrier spacing.

In an optional embodiment, CURRENT_slot [(SFN× numberOfSlotsPerFrame)+slot number in the frame]; where slot number in the frame represents an index of a Sidelink Configured Grant transmission resource in a radio frame, and its value range is [0, M−1], and M represents a total number of slots included in a radio frame; SFN represents a System Frame Number; numberOfSlotsPerFrame represents a number of slots contained in each radio frame (frame or radio frame), which is determined by a Subcarrier spacing of a Sidelink carrier on which Sidelink transmission is located, or determined by an uplink Subcarrier spacing.

In the above formula, mod represents a modulo operation and floor represents a downward rounding operation.

Optionally, the above method may further include the following execution act S73.

In act S73, first sidelink data is transmitted on the Sidelink Configured Grant resource, wherein the first sidelink data corresponds to the first Hybrid Automatic Repeat reQuest process ID.

A HARQ process ID corresponding to the Sidelink Configured Grant transmission resource determined by a terminal device through the above manner is a first HARQ process ID. The terminal device may use the first HARQ process ID to transmit first sidelink data. The first sidelink data may include a Physical Sidelink Control Channel (PSCCH) and a Physical Sidelink Shared Channel (PSSCH). In addition, the terminal device may also carry the first HARQ process ID in Sidelink Control Information (SCI), that is, sidelink data transmitted in the PSSCH corresponds to the first HARQ process ID.

Optionally, the above method may further include the following execution acts S74 and S75.

In act S74, downlink control information from a network side device is received, wherein the downlink control information is used for scheduling a sidelink transmission resource, and the downlink control information carries the first Hybrid Automatic Repeat reQuest process ID.

In act S75, the first sidelink data is retransmitted on the sidelink transmission resource scheduled by the downlink control information.

In Sidelink Configured Grant transmission, the network side device may configure a PUCCH transmission resource for the terminal device. The terminal may report sidelink feedback information to the network side device on the PUCCH transmission resource.

Optionally, the network side device configures one PUCCH transmission resource in each period of Sidelink Configured Grant. In one period of Sidelink Configured Grant, the terminal sends first sidelink data to a receiving end terminal through a Sidelink Configured Grant transmission resource, which corresponds to a first HARQ process ID. If the terminal receives sidelink feedback information of NACK sent by the receiving terminal, it will report the NACK to a network through a PUCCH in the period. If the network side device receives NACK feedback information reported by the terminal, it dynamically allocates a retransmission resource for the sidelink transmission through DCI, and indicates the first HARQ process ID in the DCI, so that the terminal device retransmits the first sidelink data on the sidelink transmission resource scheduled by the downlink control information.

Optionally, the above method may further include the following execution act S76.

In act S76, second sidelink data is transmitted on the Sidelink Configured Grant transmission resource based on a mapping relationship between the first Hybrid Automatic Repeat reQuest process ID and a second Hybrid Automatic Repeat reQuest process ID, wherein the second sidelink data corresponds to the second Hybrid Automatic Repeat reQuest process ID.

When the terminal transmits sidelink data using the Sidelink Configured Grant transmission resource, the first HARQ process ID is determined according to time domain information of the Sidelink Configured Grant transmission resource. Further, the terminal may determine the mapping relationship between the first HARQ process ID and the second HARQ process ID in advance. The terminal device may transmit the second sidelink data on the Sidelink Configured Grant transmission resource using the second HARQ process ID based on the mapping relationship. The second sidelink data may include a PSCCH and a PSSCH. In addition, the terminal device may also carry the second HARQ process ID in SCI, that is, sidelink data transmitted in the PSSCH corresponds to the second HARQ process ID.

Optionally, the above method may further include the following execution acts S77 and S78.

In act S77, downlink control information from the network side device is received, wherein the downlink control information is used for scheduling a sidelink transmission resource, and the downlink control information carries the first Hybrid Automatic Repeat reQuest process ID.

In act S78, the second sidelink data is retransmitted on the sidelink transmission resource scheduled by the downlink control information.

The network side device determines that a process ID corresponding to a transmission resource of Sidelink Configured Grant is the first HARQ process ID through a PUCCH transmission resource. When the network side device receives a NACK, a retransmission resource is dynamically allocated for the sidelink transmission through DCI, and the first HARQ process ID is indicated in the DCI. After receiving the DCI and obtaining the first HARQ process ID from the DCI, the terminal device may determine that the retransmission resource is retransmission schedule for sidelink transmission of the second HARQ process ID according to the mapping relationship between the first HARQ process ID and the second HARQ process ID.

It may be seen that, the first HARQ process ID determined by the terminal device according to the time domain information of the Sidelink Configured Grant transmission resource may be different from the second HARQ process ID used when data is transmitted by using the Sidelink Configured Grant transmission resource, and the terminal device can also determine the mapping relationship between the first HARQ process ID and the second HARQ process ID, so that the terminal device has higher flexibility or autonomy to determine a HARQ process ID for sidelink transmission.

Figure 9:
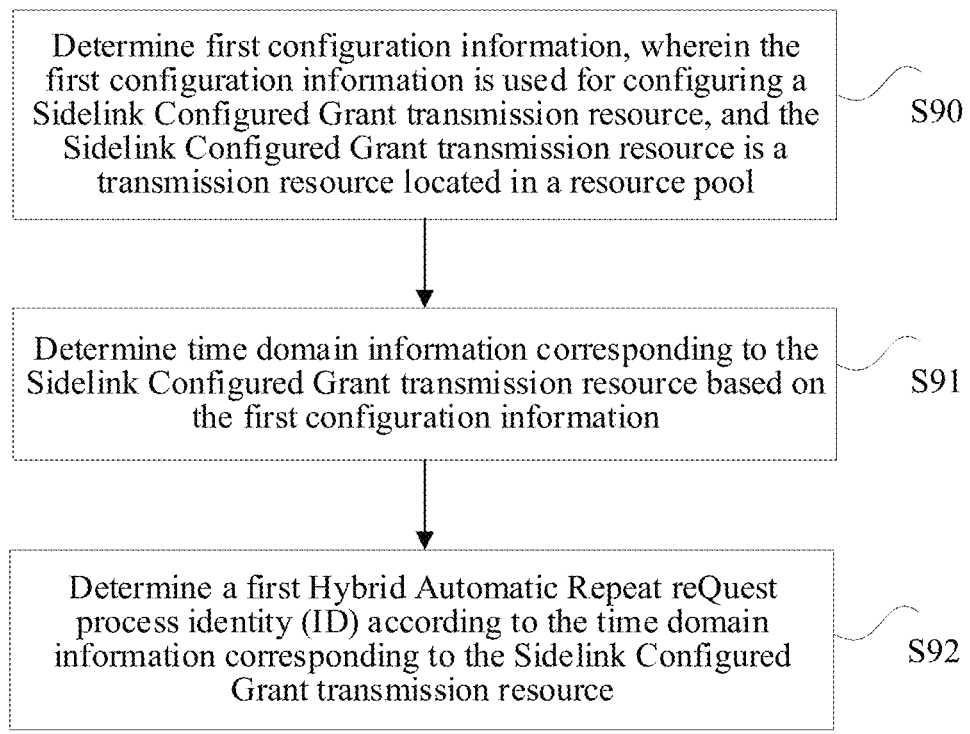
FIG. 9 is a flowchart of another information processing method according to an embodiment of the present disclosure.

In an embodiment, another information processing method running on the network side device is also provided. FIG. 9 is a flowchart of another information processing method according to one embodiment of the present disclosure. As shown in FIG. 9, the method includes the following acts S90-S92.

In act S90, first configuration information is determined, wherein the first configuration information is used for configuring a Sidelink Configured Grant transmission resource, and the Sidelink Configured Grant transmission resource is a transmission resource located in a resource pool.

In act S91, time domain information corresponding to the Sidelink Configured Grant transmission resource is determined based on the first configuration information.

In act S92, a first Hybrid Automatic Repeat reQuest process ID is determined according to the time domain information corresponding to the Sidelink Configured Grant transmission resource.

Through the above acts, first configuration information is determined and sent to a terminal, wherein the first configuration information is used for configuring a Sidelink Configured Grant transmission resource and the Sidelink Configured Grant transmission resource is a transmission resource located in a resource pool, time domain information corresponding to the Sidelink Configured Grant transmission resource is determined through the first configuration information, and a first Hybrid Automatic Repeat reQuest process ID is determined according to the time domain information corresponding to the Sidelink Configured Grant transmission resource, thereby a purpose of providing a method for determining a HARQ process ID for Sidelink Configured Grant is achieved. Thus, the following technical effects are achieved: a technical blank that a HARQ process ID cannot be determined in an aspect of Sidelink Configured Grant is effectively filled; and flexibility and diversity of a method for determining a HARQ process ID are increased, and a technical problem of lack of a method for determining a HARQ process ID for Sidelink Configured Grant in the related art is solved.

In the first configuration information, not only a Sidelink Configured Grant transmission resource may be configured, but also a PUCCH transmission resource may be configured. Transmission resources of Sidelink Configured Grant configured by a network side device for a terminal device are periodic, at most N_max (N_max=2 or 3) Sidelink Configured Grant transmission resources are included in each period, and one PUCCH transmission resource is configured in each period. The terminal device transmits sidelink data by using a Sidelink Configured Grant transmission resource in the period, and reports sidelink feedback information to the network side device by using the PUCCH transmission resource. Then, the network side device determines whether a retransmission resource needs to be allocated for the terminal according to the sidelink feedback information.

For the network side device, firstly, a PUCCH transmission resource may be determined according to the configuration information; secondly, a PUCCH is received on the PUCCH transmission resource, and according to the PUCCH, an SL CG period (i.e., a period of Sidelink Configured Grant to which the PUCCH belongs) corresponding to the PUCCH and a Sidelink Configured Grant transmission resource in the period are determined, and then a first HARQ process ID is determined according to time domain information of the Sidelink Configured Grant transmission resource.

The resource pool may be one of multiple resource pools. Specifically, still as shown in FIG. 8, a resource pool is determined within one SFN or DFN period as follows. Taking a Subcarrier spacing of 15 kHz as an example, a DFN period includes 10240 subframes (or slots) corresponding to subframes 0, 1, 2, . . . , and 10239 respectively. Subframes that cannot be used for sidelink transmission, such as a synchronization subframe, a downlink subframe, a special subframe (i.e. a downlink subframe and a special subframe in a TDD system), and a reserved subframe, are removed, and numbers of remaining subframes are $(t_0^{SL}, t_1^{SL}, \ldots, t_{T_{max}}^{SL})$. A number of these remaining subframes may be divided by $L_{bitmap}$ with no remainder. A bitmap $(b_0, b_1, \ldots, b_{L_{bitmap}-1})$ is repeated periodically in the remaining subframes, wherein, a bit being 1 indicates that a subframe, in the remaining subframes, corresponding to the bit belongs to the resource pool, otherwise it does not belong to the resource pool.

A DFN period includes 10240 subframes, and a period of a synchronization signal is 160 ms. Assuming that two synchronization subframes are included in one synchronization period, therefore, there are 128 synchronization subframes in one DFN period, and a length of a bitmap for indicating time domain resources of a resource pool is 10 bits. Thereby, two reserved subframes are required, and a number of remaining subframes is (10240−128−2=10110), which may be divided by the length of a bitmap, i.e., 10 with no remainder, thus the remaining subframes are renumbered as 0, 1, 2, . . . , and 10109. First three bits of the bitmap are 1 and remaining seven bits are 0. That is, in the remaining subframes, first three subframes in every 10 subframes belong to the resource pool, and remaining subframes do not belong to the resource pool. Since the bitmap is required to be repeated 1011 times in the remaining subframes to indicate whether all subframes belong to the resource pool, and 3 subframes are included in each bitmap period, a total of 3033 subframes belong to the resource pool in one DFN period. Each slot index in the resource pool corresponds to one slot index in the DFN period. For example, slots 0, 1, 2, 3, 4, and 5 in the resource pool correspond to slots 0, 2, 4, 13, 14, and 15 in the DFN period, respectively. A Sidelink Configured Grant transmission resource configured by a network will be associated with one resource pool, and the Sidelink Configured Grant transmission resource configured by the network is a transmission resource located in the one resource pool.

In the embodiment, time domain information corresponding to a Sidelink Configured Grant transmission resource is a slot index of the Sidelink Configured Grant transmission resource in a resource pool. For example, for the above embodiment, the resource pool where the Sidelink Configured Grant transmission resource is located includes 3033 subframes, so time domain information corresponding to the Sidelink Configured Grant transmission resource is a slot index in the resource pool, that is, a slot index in a range of [0, 3032].

Optionally, the time domain information corresponding to the Sidelink Configured Grant transmission resource is an index of a slot in slots that are possibly used for the resource pool. For example, for the above embodiment, a set of slots that are possibly used for the resource pool is the remaining subframes of which a corresponding slot index range is [0, 10109].

Optionally, the above method may further include the following execution act S93.

In act S93, first configuration information is sent to a terminal, wherein the first configuration information is also used for the terminal to determine time domain information corresponding to a Sidelink Configured Grant transmission resource and to determine a first Hybrid Automatic Repeat reQuest process ID according to the time domain information corresponding to the Sidelink Configured Grant transmission resource.

The first Hybrid Automatic Repeat reQuest process ID may be determined not only by a network side device according to the first configuration information, but also by a terminal device according to the first configuration information. Therefore, the network side device may send the first configuration information to the terminal device, so that the terminal device determines the time domain information corresponding to the Sidelink Configured Grant transmission resource and determines the first Hybrid Automatic Repeat reQuest process ID according to the time domain information corresponding to the Sidelink Configured Grant transmission resource.

Optionally, at least one of following parameters may be determined through the above first configuration information: (1) a period of a Sidelink Configured Grant transmission resource; (2) a total number of HARQ process IDs corresponding to current Configured Grant; (3) a HARQ process ID offset which is used for determining a first HARQ process ID corresponding to the current Configured Grant; (4) a slot corresponding to a time domain resource of a Sidelink Configured Grant transmission resource.

In one implementation, the configuration information includes slot offset indication information and a period parameter, and a Sidelink Configured Grant transmission resource is determined according to the slot offset indication information and the period parameter; wherein, the slot offset indication information is used for determining time domain information of a first Sidelink Configured Grant transmission resource in a period of a system frame number (or in a period of a direct frame number). The slot offset indication information is represented by a number of slots, and the number of slots represents a number of physical slots or a number of logical slots, wherein the logical slots are slots in a resource pool associated with the Configured Grant transmission resource or candidate slots for the resource pool. The period parameter is used for determining a period of a Sidelink Configured Grant transmission resource which is represented by a number of slots. The number of slots represents a number of physical slots or a number of logical slots, wherein the logical slots are slots in a resource pool associated with the Configured Grant transmission resource or candidate slots for the resource pool.

Optionally, in act S92, the first Hybrid Automatic Repeat reQuest process ID is determined according to the time domain information corresponding to the Sidelink Configured Grant transmission resource, which may include the following execution acts S920 and S922.

In act S920, a period parameter is determined based on the first configuration information, wherein the period parameter is a period of the Sidelink Configured Grant transmission resource.

In act S922, the first Hybrid Automatic Repeat reQuest process ID is determined according to the time domain information corresponding to the Sidelink Configured Grant transmission resource and the period parameter.

Optionally, the period of the Sidelink Configured Grant transmission resource is represented by a number of slots, which is used for describing a number of slots in a resource pool where the Sidelink Configured Grant transmission resource is located. Optionally, the period of the Sidelink Configured Grant transmission resource is represented by a number of slots and used for describing a number of candidate slots for a resource pool.

If the parameter periodicity is represented by a number of slots, a corresponding first HARQ process ID is determined through the following formula according to a time domain position of the Sidelink Configured Grant transmission resource in a resource pool where the Sidelink Configured Grant is located.

$$\text{HARQ Process ID} = [\text{floor}(\text{CURRENT\_slot}/\text{periodicity})] \bmod \text{nrofHARQ-Processes} + \text{harq-procID-offset}$$

Herein, meanings of various parameters in this formula are as follows.

(1) CURRENT_slot represents a slot corresponding to a time domain resource of a Sidelink Configured Grant transmission resource, and an index of the slot is an index of a slot in a resource pool where Sidelink Configured Grant is located; a value range of this parameter is [0, N−1], N represents a total number of slots contained in a current resource pool, and the index of the slot is an index of a slot in the resource pool where the Sidelink Configured Grant is located.

(2) periodicity represents a period of the Sidelink Configured Grant transmission resource, which is represented by slots; further, it represents a number of slots in the resource pool where the Sidelink Configured Grant is located.

(3) nrofHARQ-Processes represents a total number of HARQ process IDs corresponding to the Sidelink Configured Grant.

(4) harq-procID-offset is used for determining a first HARQ process ID corresponding to the Sidelink Configured Grant; optionally, if a network side device does not configure this parameter, a value of this parameter is 0.

In the above formula, mod represents a modulo operation and floor represents a downward rounding operation.

Still as shown in FIG. 8, a network side device configures a transmission resource of Sidelink Configured Grant in a resource pool. Three slots of a period of the Sidelink Configured Grant represent three slots in the resource pool. A first slot position of the Sidelink Configured Grant is slot 2. According to the period of the Sidelink Configured Grant, slots such as slot 5, slot 8, and slot 11, etc. will include the transmission resource of the Sidelink Configured Grant.

In the above formula for calculating a HARQ process ID, CURRENT_slot represents a slot where the transmission resource of the Sidelink Configured Grant in the resource pool is located, namely, slot 2, slot 5, slot 8, slot 11, slot 14, slot 17, . . . , and slot 3032, etc. Parameter periodicity represents a period of the transmission resource of the Sidelink Configured Grant, which may be represented by a number of slots in a resource pool where the Configured Grant is located, that is, the period is 3 slots. If nrofHARQ-Processes=4 and harq-procID-offset-0 is configured, HARQ process IDs corresponding to the Sidelink Configured Grant are 0, 1, 2, and 3, respectively. In this embodiment, HARQ process IDs corresponding to transmission resources of the Sidelink Configured Grant at time domain positions such as slot 2, slot 5, slot 8, slot 11, slot 14, and slot 17, etc. are respectively 0, 1, 2, 3, 0, and 1, etc.

In a process of determining the first Hybrid Automatic Repeat reQuest process ID according to the time domain information corresponding to the Sidelink Configured Grant transmission resource, the network side device configures the Sidelink Configured Grant transmission resource for the terminal. According to a time domain position of the Sidelink Configured Grant transmission resource on a Sidelink, the corresponding first HARQ process ID may be determined through the following formula.

$$\text{HARQ Process ID} = [\text{floor}(\text{CURRENT\_slot} \times 10/(\text{numberOfSlotsPerFrame} \times \text{periodicity}))] \bmod \text{nrofHARQ-Processes} + \text{harq-procID-offset}$$

Herein, meanings of various parameters in the above formula are as follows.

(1) numberOfSlotsPerFrame represents a number of slots contained in each radio frame (frame or radio frame).

(2) periodicity represents a period of a Sidelink Configured Grant transmission resource, and is represented in millisecond (ms).

(3) nrofHARQ-Processes represents a total number of HARQ process IDs corresponding to current Sidelink Configured Grant.

(4) harq-procID-offset is used for determining a first HARQ process ID corresponding to the current Sidelink Configured Grant; in an optional embodiment, a value of this parameter is 0 if the network side device does not configure this parameter.

CURRENT_slot represents a slot corresponding to a time domain resource of a Sidelink Configured Grant transmission resource, a value range of this parameter is [0, N−1], N represents a total number of slots contained in a current resource pool, and an index of the slot is an index of a slot in a resource pool where Sidelink Configured Grant is located.

In an optional embodiment, CURRENT_slot [(DFN× numberOfSlotsPerFrame)+slot number in the frame]; where slot number in the frame represents an index of a Sidelink Configured Grant transmission resource in a radio frame, and its value range is [0, M−1], and M represents a total number of slots included in a radio frame; DFN represents a Direct Frame Number; numberOfSlotsPerFrame represents a number of slots contained in each radio frame (frame or radio frame), which is determined by a Subcarrier spacing of a Sidelink carrier on which Sidelink transmission is located, or determined by an uplink Subcarrier spacing.

In an optional embodiment, CURRENT_slot=[(SFN× numberOfSlotsPerFrame)+slot number in the frame]; where slot number in the frame represents an index of a Sidelink Configured Grant transmission resource in a radio frame, and its value range is [0, M−1], and M represents a total number of slots included in a radio frame; SFN represents a System Frame Number; numberOfSlotsPerFrame represents a number of slots contained in each radio frame (frame or radio frame), which is determined by a Subcarrier spacing of a Sidelink carrier on which Sidelink transmission is located, or determined by an uplink Subcarrier spacing.

In the above formula, mod represents a modulo operation and floor represents a downward rounding operation.

Optionally, in act S91, determining the time domain information corresponding to the Sidelink Configured Grant transmission resource based on the first configuration information may include following execution acts S910 and S912.

In act S910, an uplink control channel sent by a terminal is received on an uplink transmission resource based on the first configuration information, wherein the uplink transmission resource and the Sidelink Configured Grant transmission resource belong to a same Sidelink Configured Grant period, and the uplink control channel is used for the terminal to report sidelink feedback information.

In act S912, time domain information corresponding to the Sidelink Configured Grant transmission resource is determined according to time domain information of the uplink transmission resource.

In a process of configuring Sidelink Configured Grant, the network side device also configures an uplink transmission resource for transmitting a PUCCH, so that there is a corresponding PUCCH transmission resource in each period of Sidelink Configured Grant. The terminal device sends sidelink feedback information to the network side device through the PUCCH. After receiving the PUCCH sent by the terminal device on the uplink transmission resource, the network side device may determine a time domain position of a Sidelink Configured Grant transmission resource in a same period as the PUCCH according to the PUCCH, and further may determine a HARQ process ID corresponding to the Sidelink Configured Grant transmission resource according to the above formula.

Optionally, the above method may further include the following execution act [00233] S94.

In act S94, at least one of following parameters: a first parameter and a second parameter, is determined; wherein the first parameter is used for determining a time interval between the uplink transmission resource and a Sidelink feedback channel transmission resource, and the second parameter is used for determining a time interval between the sidelink feedback channel transmission resource and the Sidelink Configured Grant transmission resource.

A slot resource of the PUCCH is a slot in an SFN period, and a slot of the Sidelink Configured Grant transmission resource is a slot in the SFN period (or a DEN period). Time domain information of the Sidelink Configured Grant transmission resource is determined according to an SFN index (or a DFN index) and a slot number in a radio frame. An uplink transmission resource is used for PUCCH transmission, and its time domain position is determined by an SFN and a slot number in a radio frame. Optionally, a starting slot of the SFN period and a starting slot of the DFN period, i.e. SFN #0 and DFN #0, are not aligned, and there is a time interval between them.

Figure 10:
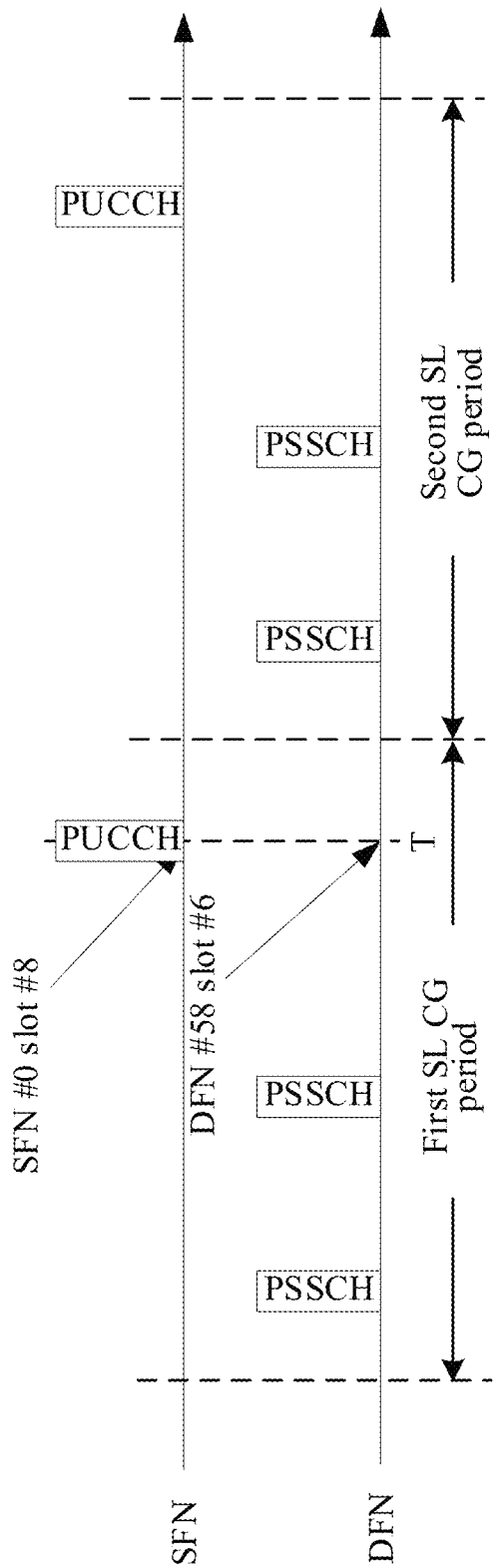
FIG. 10 is a schematic diagram of a time interval existing between a System Frame Number (SFN) period and a Direct Frame Number (DFN) period according to an optional embodiment of the present disclosure.

FIG. 10 is a schematic diagram of a time interval existing between an SFN period and a DFN period according to an optional embodiment of the present disclosure. As shown in FIG. 10, a network side device configures a transmission resource of Sidelink Configured Grant and a PUCCH resource, and configures a period of the Sidelink Configured Grant is 10 ms, corresponding to four HARQ process IDs, which are 0, 1, 2, and 3 respectively. A Subcarrier spacing of a sidelink carrier and a Subcarrier spacing of an uplink carrier are both 15 kHz, i.e., each radio frame includes 10 slots. A transmission moment of the PUCCH determined according to the configuration information is moment T, then the moment T corresponds to slot 8 of SFN #0 of the Sidelink Configured Grant transmission resource, and corresponds to slot 6 of DFN #58.

Optionally, the network side device may know a time interval between transmission time of a sidelink and transmission time of an uplink, because the network side device receives a PUCCH at moment T, and a time domain position on a sidelink corresponding to a time domain position T of the PUCCH may be determined according to the time domain position T of the PUCCH.

It should be noted that a Sidelink Configured Grant transmission resource associated with a PUCCH is a Sidelink Configured Grant transmission resource in a same Sidelink Configured Grant period as the PUCCH. Sidelink feedback information corresponding to sidelink data transmitted on the Sidelink Configured Grant transmission resource in this period is reported to the network side device through a PUCCH associated with the Sidelink Configured Grant transmission resource, that is, the PUCCH in this period.

Therefore, the network side device needs to determine a time interval between the uplink transmission resource and the sidelink feedback channel transmission resource, and/or a time interval between the sidelink feedback channel transmission resource and the Sidelink Configured Grant transmission resource.

Optionally, in act S912, determining the time domain information corresponding to the Sidelink Configured Grant transmission resource according to time domain information of the uplink transmission resource may include the following execution act S9120.

In act S9120, time domain information corresponding to the Sidelink Configured Grant transmission resource is determined according to the time domain information of the uplink transmission resource and at least one of a first parameter and a second parameter.

In an optional embodiment, the first configuration information is further used for configuring at least one of the uplink transmission resource and the first parameter.

If the network side device receives a PUCCH at moment T, a time domain position corresponding to a Physical Sidelink Feedback Channel (PSFCH for short) is determined according to a time interval between a PUCCH transmission resource and a PSFCH transmission resource. Further, the network side device may determine a time domain position of a transmission resource of Sidelink Configured Grant in a period where the PSFCH is located, and further determine a HARQ process ID corresponding to a sidelink transmission resource corresponding to the PUCCH.

For example, the network side device configures a transmission resource of Sidelink Configured Grant for the terminal in a resource pool, and configures a PUCCH transmission resource. The resource pool includes a PSFCH transmission resource, and a period of the PSFCH is two slots, namely, every two slots in the resource pool include a slot for transmitting the PSFCH, and a configured time interval between a PUCCH time domain resource and the PSFCH is three slots. Therefore, when receiving a PUCCH, the network side device may determine a slot position of a PSFCH corresponding to the PUCCH according to a slot position of a PUCCH time domain resource. In an optional example, the slot position of the PSFCH is a slot in which a last PSFCH in a period of the Sidelink Configured Grant transmission resource is located. Therefore, the network side device may determine the slot of the Sidelink Configured Grant transmission resource in a period in which the PSFCH is located according to the slot of the PSFCH, and further may determine a HARQ process ID corresponding to the Sidelink Configured Grant transmission resource.

Therefore, in a process of determining the HARQ process ID according to the time domain position of the Sidelink corresponding to the Sidelink Configured Grant transmission resource, the network side device may determine the HARQ process ID of Sidelink transmission corresponding to a configured PUCCH transmission resource based on a time interval between the Sidelink and an uplink.

Optionally, the above method may further include the following execution acts S95 and S96.

In act S95, second configuration information is sent to the terminal, wherein the second configuration information is used for configuring a resource pool.

In act S96, a second parameter is determined according to the second configuration information.

In addition to sending the first configuration information to the terminal device, the network side device may also send the second configuration information for configuring the resource pool to the terminal device. In addition, a time interval between a sidelink feedback channel transmission resource and the Sidelink Configured Grant transmission resource may be determined based on the second configuration information.

Optionally, the above method may further include the following execution act S97.

In act S97, downlink control information is sent to the terminal when an uplink control channel carries non-acknowledgement information, wherein the downlink control information is used for scheduling a sidelink transmission resource, the downlink control information carries the first Hybrid Automatic Repeat reQuest process ID, and the downlink control information is used for scheduling the terminal to retransmit sidelink data corresponding to the first Hybrid Automatic Repeat reQuest process ID on the sidelink transmission resource.

In Sidelink Configured Grant transmission, the network side device may configure a PUCCH transmission resource for the terminal device. The terminal may report sidelink feedback information to the network side device on the PUCCH transmission resource. If the network side device receives NACK feedback information reported by the terminal, the network side device dynamically allocates a retransmission resource for the sidelink transmission through DCI, and indicates the first HARQ process ID in the DCI, so that the terminal device retransmits first sidelink data on the sidelink transmission resource scheduled by the downlink control information. Therefore, the first HARQ process ID is carried in the DCI when the network side device allocates the retransmission resource to the terminal device in a dynamic scheduling manner through the DCI, so that the terminal device may determine a first HARQ process ID corresponding to the retransmission resource scheduled by the DCI after receiving the DCI.

Of course, in the Sidelink Configured Grant transmission, the network side device may not configure a PUCCH transmission resource for the terminal device. In this case, the terminal does not need to report sidelink feedback information to the network side device, that is, retransmission does not need to be performed based on network scheduling. If a sending side terminal receives a NACK on a PSFCH from a receiving side terminal, the sending side terminal may perform retransmission. However, sidelink transmission of the sending side terminal usually uses a Sidelink Configured Grant transmission resource allocated by the network side device. In this case, a HARQ process ID corresponding to sidelink transmission is determined by the sending side terminal itself, and has nothing to do with a time domain position of the Sidelink Configured Grant transmission resource.

Figure 11:
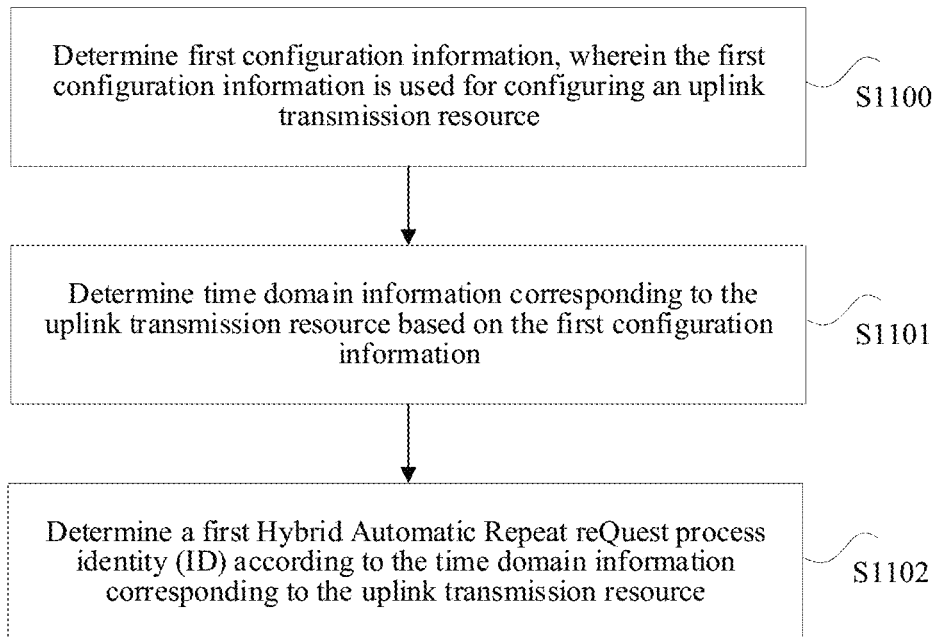
FIG. 11 is a flowchart of yet another information processing method according to an embodiment of the present disclosure.

In an embodiment, another information processing method running on the network side device is also provided. FIG. 11 is a flowchart of another information processing method according to one embodiment of the present disclosure. As shown in FIG. 11, the method includes the following acts S1100-S1102.

In act S1100, first configuration information is determined, wherein the first configuration information is used for configuring an uplink transmission resource.

In act S1101, time domain information corresponding to the uplink transmission resource is determined based on the first configuration information.

In act S1102, a first Hybrid Automatic Repeat reQuest process ID is determined according to the time domain information corresponding to the uplink transmission resource.

Different from the information processing method shown in FIG. 9, in the information processing method shown in FIG. 11, a HARQ ID is no longer determined based on a time domain position of a sidelink transmission resource, but the HARQ ID is determined based on a time domain position of the uplink transmission resource.

Optionally, the above method may further include the following execution acts S1103 and S1104.

In act S1103, a period parameter is determined based on the first configuration information, wherein the first configuration information is also used for configuring a Sidelink Configured Grant transmission resource, the Sidelink Configured Grant transmission resource is used for transmitting sidelink data, and the period parameter is used for determining a period of the Sidelink Configured Grant transmission resource.

The Sidelink Configured Grant transmission resource and the uplink transmission resource are associated, namely, sidelink feedback information corresponding to the sidelink data transmitted on the Sidelink Configured Grant transmission resource is transmitted to the network side device on the uplink transmission resource.

In act S1104, a first Hybrid Automatic Repeat reQuest process ID is determined according to the time domain information corresponding to the uplink transmission resource and the period parameter.

In the first configuration information, not only a Sidelink Configured Grant transmission resource may be configured, but also an uplink transmission resource may be configured. Transmission resources of Sidelink Configured Grant configured by the network side device for a terminal device are periodic, at most N_max (N_max=2 or 3) Sidelink Configured Grant transmission resources are included in each period, and one PUCCH transmission resource is configured in each period. The terminal device transmits sidelink data by using a Sidelink Configured Grant transmission resource in the period, and reports sidelink feedback information to the network side device by using the PUCCH transmission resource. Then, the network side device determines whether a retransmission resource needs to be allocated for a terminal according to the sidelink feedback information.

Optionally, time domain information corresponding to a Sidelink Configured Grant transmission resource is a slot index of the Sidelink Configured Grant transmission resource in a resource pool. A period parameter is represented by a number of slots, and the number of slots is a number of slots in a resource pool or a number of candidate slots used for a resource pool.

The resource pool may be one of multiple resource pools. Specifically, still as shown in FIG. 8, a resource pool is determined within one SFN or DFN period as follows. Taking a Subcarrier spacing of 15 kHz as an example, a DFN period includes 10240 subframes (or slots) corresponding to subframes 0, 1, 2, . . . , and 10239 respectively. Subframes that cannot be used for sidelink transmission, such as a synchronization subframe, a downlink subframe, a special subframe (i.e. a downlink subframe and a special subframe in a TDD system), and a reserved subframe, are removed, and numbers of remaining subframes are $(t_0^{SL}, t_1^{SL}, \ldots, t_{T_{max}}^{SL})$. A number of these remaining subframes may be divisible by $L_{bitmap}$, a bitmap $(b_0, b_1, \ldots, b_{L_{bitmap}-1})$ is repeated periodically in the remaining subframes, wherein, a bit of 1 indicates that a subframe corresponding to the bit in the remaining subframes belongs to the resource pool, otherwise it does not belong to the resource pool.

A DFN period includes 10240 subframes, and a period of a synchronization signal is 160 ms. Assuming that two synchronization subframes are included in one synchronization period, therefore, there are 128 synchronization subframes in one DFN period, and a length of a bitmap for indicating a time domain resource of a resource pool is 10 bits. To do this, two reserved subframes are required, and a number of remaining subframes is (10240−128−2=10110), which may be divisible by a length of a bitmap of 10, thus the remaining subframes are renumbered as 0, 1, 2, . . . , and 10109, with first three bits of the bitmap being 1 and remaining seven bits being 0. That is, in the remaining subframes, first three subframes in every 10 subframes belong to the resource pool, and remaining subframes do not belong to the resource pool. Since the bitmap is required to be repeated 1011 times in the remaining subframes to indicate whether all subframes belong to the resource pool, and 3 subframes are included in each bitmap period, a total of 3033 subframes belong to the resource pool in one DFN period. Each slot index in the resource pool corresponds to one slot index in the DFN period. For example, slots 0, 1, 2, 3, 4, and 5 in the resource pool correspond to slots 0, 2, 4, 13, 14, and 15 in the DFN period, respectively. A Sidelink Configured Grant transmission resource configured by a network will be associated with one resource pool, and the Sidelink Configured Grant transmission resource configured by the network is a transmission resource located in the one resource pool.

In the embodiment, time domain information corresponding to a Sidelink Configured Grant transmission resource is a slot index of the Sidelink Configured Grant transmission resource in a resource pool. For example, for the above embodiment, a resource pool where a Sidelink Configured Grant transmission resource is located includes 3033 subframes, so time domain information corresponding to the Sidelink Configured Grant transmission resource is a slot index in the resource pool, that is, a slot index in a range of [0, 3032].

Optionally, the time domain information corresponding to the Sidelink Configured Grant transmission resource is an index of a slot in slots that are used for the resource pool. For example, for the above embodiment, a set of slots that is possibly used for the resource pool is the remaining subframes, and a corresponding slot index range is [0, 10109].

Optionally, the above method may further include the following execution act S1105.

In act S1105, downlink control information is sent to a terminal, wherein the downlink control information is used for scheduling a sidelink transmission resource, and the downlink control information carries a first Hybrid Automatic Repeat reQuest process ID.

In an optional embodiment, the terminal sends a negative acknowledgement to the network side device on the uplink transmission resource. When the network side device detects a negative acknowledgement on the uplink transmission resource, it sends downlink control information to the terminal, and the downlink control information carries the first HARQ process ID. After receiving the downlink control information, the terminal may obtain the first HARQ process ID from the downlink control information.

In Sidelink Configured Grant transmission, the network side device may configure a PUCCH transmission resource for the terminal device. The terminal may report sidelink feedback information to the network side device on the PUCCH transmission resource. If the network side device receives NACK feedback information reported by the terminal, it dynamically allocates a retransmission resource for the sidelink transmission through DCI, and indicates the first HARQ process ID in the DCI, so that the terminal device retransmits first sidelink data on the sidelink transmission resource scheduled by the downlink control information. Therefore, the first HARQ process ID is carried in the DCI when the network side device allocates the retransmission resource to the terminal device in a dynamic scheduling manner through the DCI, so that the terminal device may determine the first HARQ process ID corresponding to the retransmission resource scheduled by the DCI after receiving the DCI.

For example, the network side device sends first configuration information to the terminal, and the first configuration information is used for configuring a Sidelink Configured Grant transmission resource and an uplink transmission resource. The terminal transmits sidelink data on the Sidelink Configured Grant transmission resource. If sidelink feedback information received by the terminal is a NACK, the terminal transmits the NACK to the network side device on the uplink transmission resource. Then, the network side device determines a first HARQ process ID according to a time domain position of the uplink transmission resource, and schedules a sidelink transmission resource for the terminal through DCI for the terminal to retransmit the sidelink data. Herein the first HARQ process ID is carried in the DCI. The terminal is responsible for receiving the DCI and according to the first HARQ process ID, it may determine that the DCI is retransmission schedule of the network side device for the NACK transmitted on the uplink transmission resource. Further, the terminal may determine that the DCI is retransmission schedule for sidelink data transmitted on the Sidelink Configured Grant transmission resource associated with the uplink transmission resource, and therefore, the terminal retransmits the sidelink data on the sidelink transmission resource scheduled by the DCI.

Of course, in Sidelink Configured Grant transmission, the network side device may not configure a PUCCH transmission resource for the terminal device. In this case, the terminal does not need to report sidelink feedback information to the network side device, that is, retransmission does not need to be performed based on network scheduling. If a sending side terminal receives a NACK on a PSFCH from a receiving side terminal, the sending side terminal may perform retransmission. However, sidelink transmission of the sending side terminal usually uses a Sidelink Configured Grant transmission resource allocated by the network side device. In this case, a HARQ process ID corresponding to sidelink transmission is determined by the sending side terminal itself, and has nothing to do with a time domain position of the Sidelink Configured Grant transmission resource.

Figure 12:
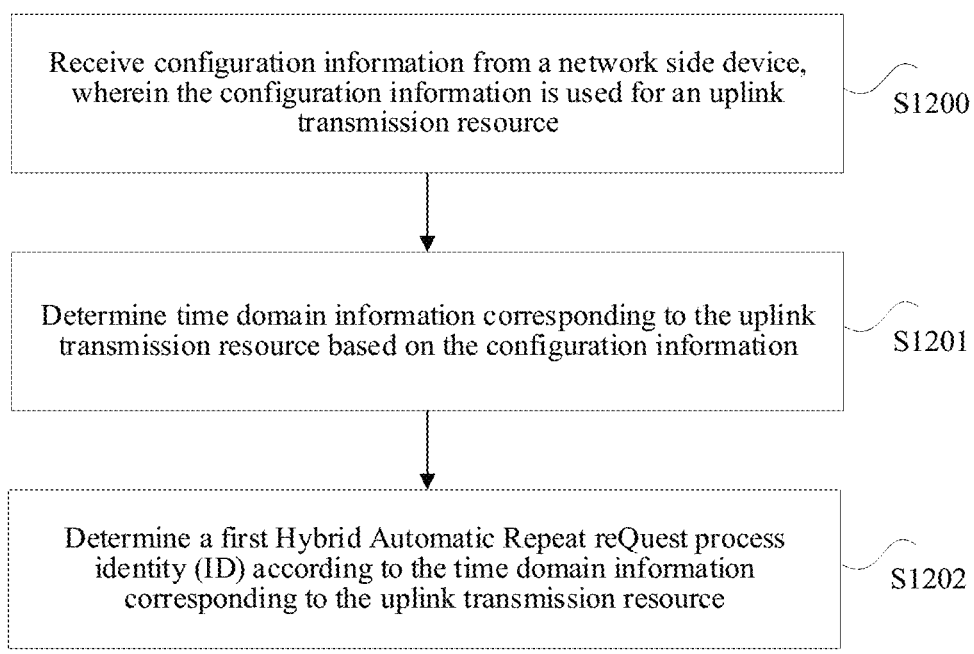
FIG. 12 is a flowchart of yet another information processing method according to an embodiment of the present disclosure.

In an embodiment, yet another information processing method running on the network side device is also provided. FIG. 12 is a flowchart of yet another information processing method according to one embodiment of the present disclosure. As shown in FIG. 12, the method includes the following acts S1200 to S1202.

In act S1200, configuration information from a network side device is received, wherein the configuration information is used for an uplink transmission resource.

In act S1201, time domain information corresponding to the uplink transmission resource is determined based on the configuration information.

In act S1202, a first Hybrid Automatic Repeat reQuest process ID is determined according to the time domain information corresponding to the uplink transmission resource.

Different from the information processing method shown in FIG. 7, in the information processing method shown in FIG. 12, a HARQ ID is no longer determined based on a time domain position of a sidelink transmission resource, but the HARQ ID is determined based on a time domain position of the uplink transmission resource.

Optionally, the configuration information is also used for configuring a Sidelink Configured Grant transmission resource for transmitting sidelink data.

In the configuration information, not only a Sidelink Configured Grant transmission resource may be configured, but also a PUCCH transmission resource may be configured. Herein the PUCCH transmission resource is a PUCCH resource corresponding to the Sidelink Configured Grant transmission resource, i.e., sidelink feedback information associated with sidelink data transmitted on the Sidelink Configured Grant transmission resource is reported to the network side device through the PUCCH transmission resource. For the terminal device, the first Hybrid Automatic Repeat reQuest process ID may be determined according to a time domain position of the uplink transmission resource.

Optionally, the above method may further include the following execution act S1203.

In act S1203, at least one of following parameters: a first parameter and a second parameter, is determined; wherein the first parameter is used for determining a time interval between the uplink transmission resource and the sidelink feedback channel transmission resource, and the second parameter is used for determining a time interval between the sidelink feedback channel transmission resource and the Sidelink Configured Grant transmission resource.

A slot resource of a PUCCH is a slot in an SFN period, and a slot of the Sidelink Configured Grant transmission resource is a slot in the SFN period (or a DFN period). Time domain information of a Sidelink Configured Grant transmission resource is determined according to an SFN index (or a DFN index) and a slot number of the Sidelink Configured Grant transmission resource in a radio frame. An uplink transmission resource is used for PUCCH transmission, and its time domain position is determined by an SFN and a slot number in a radio frame. Optionally, a starting slot of the SFN period and a starting slot of the DFN period, i.e. SFN #0 and DFN #0, are not aligned and there is a time interval between them.

It should be noted that a Sidelink Configured Grant transmission resource associated with a PUCCH is a Sidelink Configured Grant transmission resource in a same Sidelink Configured Grant period as the PUCCH. Sidelink feedback information corresponding to sidelink data transmitted on the Sidelink Configured Grant transmission resource in this period is reported to the network side device through a PUCCH associated with the Sidelink Configured Grant transmission resource, that is, the PUCCH in this period.

Therefore, the network side device needs to determine a time interval between the uplink transmission resource and the sidelink feedback channel transmission resource, and/or a time interval between the sidelink feedback channel transmission resource and the Sidelink Configured Grant transmission resource.

Optionally, the above method may further include the following execution acts S1204 and S1205.

In act S1204, time domain information corresponding to the Sidelink Configured Grant transmission resource is determined according to the time domain information of the uplink transmission resource and at least one of the first parameter and the second parameter, and a correspondence relationship between the uplink transmission resource and the Sidelink Configured Grant transmission resource is obtained.

In act S1205, a Sidelink Configured Grant transmission resource corresponding to the first Hybrid Automatic Repeat reQuest process ID is determined according to the first Hybrid Automatic Repeat reQuest process ID and the correspondence relationship between the uplink transmission resource and the Sidelink Configured Grant transmission resource.

If the network side device receives a PUCCH at moment T, a first Hybrid Automatic Repeat reQuest process ID is determined according to a time domain resource of the PUCCH, and further, a time domain position corresponding to a PSFCH is determined according to a time interval between a PUCCH transmission resource and a PSFCH transmission resource. Further, the network side device may determine a time domain position of a Sidelink Configured Grant transmission resource in a period in which the PSFCH is located, and further determine a Sidelink Configured Grant transmission resource corresponding to the first HARQ process ID.

For example, the network side device configures a transmission resource of Sidelink Configured Grant for the terminal in a resource pool, and configures a PUCCH transmission resource. The resource pool includes a PSFCH transmission resource, and a period of the PSFCH is two slots, namely, every two slots in the resource pool include a slot for transmitting the PSFCH, and a configured time interval between a PUCCH time domain resource and the PSFCH is three slots. Therefore, when receiving a PUCCH, the network side device may determine a first HARQ process ID according to a slot position of the PUCCH time domain resource. In addition, the network side device determines a slot position of a PSFCH corresponding to the PUCCH according to the time interval between the PUCCH transmission resource and the PSFCH transmission resource. In an optional example, the slot position of the PSFCH is a slot in which a last PSFCH in a period of the Sidelink Configured Grant transmission resource is located. Therefore, the network side device may determine the slot of the Sidelink Configured Grant transmission resource in a period in which a PSFCH is located according to the slot of the PSFCH, and further may determine the Sidelink Configured Grant transmission resource corresponds to the first HARQ process ID.

Therefore, in a process of determining the HARQ process ID according to the time domain position of the PUCCH transmission resource, the network side device may determine a HARQ process ID corresponding to a configured Sidelink Configured Grant transmission resource based on a time interval between a sidelink and an uplink.

Optionally, the above method may further include the following execution act S1206.

In act S1206, first sidelink data is transmitted on the Sidelink Configured Grant transmission resource, wherein the first sidelink data corresponds to the first Hybrid Automatic Repeat reQuest process ID.

The terminal device may use the first HARQ process ID to transmit the first sidelink data. The first sidelink data may include a PSCCH and a PSSCH. In addition, the terminal device may also carry the first HARQ process ID in SCI, that is, sidelink data transmitted in the PSSCH corresponds to the first HARQ process ID.

Optionally, the above method may further include the following execution acts S1207 and S1208.

In act S1207, downlink control information sent by the network side device is received, wherein the downlink control information is used for scheduling a sidelink transmission resource, and the downlink control information carries the first Hybrid Automatic Repeat reQuest process ID.

In act S1208, the first Sidelink data is retransmitted on the sidelink transmission resource.

In Sidelink Configured Grant transmission, the network side device may configure a PUCCH transmission resource for the terminal device. The terminal may report sidelink feedback information to the network side device on the PUCCH transmission resource.

Optionally, the network side device configures one PUCCH transmission resource in each period of Sidelink Configured Grant. In one period of Sidelink Configured Grant, the terminal sends the first sidelink data to a receiving end terminal through a Sidelink Configured Grant transmission resource, which corresponds to a first HARQ process ID. If the terminal receives sidelink feedback information of NACK sent by the receiving terminal, it will report the NACK to a network through a PUCCH in the period. If the network side device receives NACK feedback information reported by the terminal, and a first HARQ process ID is determined according to a time domain position of the PUCCH transmission resource, the network side device dynamically allocates a retransmission resource for the sidelink transmission through DCI, and indicates the first HARQ process ID in the DCI, so that the terminal device retransmits first sidelink data on the sidelink transmission resource scheduled by the downlink control information.

Optionally, the above method may further include the following execution act S1209.

In act S1209, second sidelink data is transmitted on a Sidelink Configured Grant transmission resource, wherein the second sidelink data corresponds to a second Hybrid Automatic Repeat reQuest process ID.

When the terminal transmits sidelink data using the Sidelink Configured Grant transmission resource, a first HARQ process ID is determined according to time domain information of the Sidelink Configured Grant transmission resource. Further, the terminal may determine a mapping relationship between the first HARQ process ID and the second HARQ process ID in advance. The terminal device may transmit the second sidelink data on the Sidelink Configured Grant transmission resource using the second HARQ process ID based on the mapping relationship. The second sidelink data may include a PSCCH and a PSSCH. In addition, the terminal device may also carry the second HARQ process ID in SCI, that is, sidelink data transmitted in the PSSCH corresponds to the second HARQ process ID.

Optionally, the above method may further include the following execution act S1210.

In act S1210, a mapping relationship between the first Hybrid Automatic Repeat reQuest process ID and the second Hybrid Automatic Repeat reQuest process ID is determined.

Optionally, the above method may further include the following execution acts S1211 and S1212.

In act S1211, downlink control information sent by the network side device is received, wherein the downlink control information is used for scheduling a sidelink transmission resource, and the downlink control information carries the first Hybrid Automatic Repeat reQuest process ID.

In act S1212, the second sidelink data is retransmitted on a sidelink transmission resource based on the mapping relationship between the first Hybrid Automatic Repeat reQuest process ID and the second Hybrid Automatic Repeat reQuest process ID.

The network side device determines the first HARQ process ID through a PUCCH transmission resource, and determines a process ID corresponding to a Sidelink Configured Grant transmission resource as the first HARQ process ID according to a correspondence relationship between the PUCCH and the Sidelink Configured Grant transmission resource. When the network side device receives a NACK, a retransmission resource is dynamically allocated for the sidelink transmission through DCI, and the first HARQ process ID is indicated in the DCI. After receiving the DCI and obtaining the first HARQ process ID from the DCI, the terminal device may determine that the retransmission resource is retransmission schedule for sidelink transmission of the second HARQ process ID according to the mapping relationship between the first HARQ process ID and the second HARQ process ID.

It may be seen that, the first HARQ process ID determined by the terminal device according to the time domain information of the Sidelink Configured Grant transmission resource may be different from the second HARQ process ID used when data is transmitted using the Sidelink Configured Grant transmission resource, and the terminal device can also determine the mapping relationship between the first HARQ process ID and the second HARQ process ID, so that the terminal device has higher flexibility or autonomy to determine a HARQ process ID for sidelink transmission.

In an embodiment, another information processing method running on the terminal device is also provided.

A first Hybrid Automatic Repeat reQuest process ID is determined according to the following formula.

$$\text{HARQ Process ID} = [\text{floor}(\text{CURRENT\_slot}/\text{periodicity})] \bmod \text{nrofHARQ-Processes} + \text{harq-procID-offset}$$

Herein, meanings of various parameters in this formula are as follows.

(1) CURRENT_slot represents a slot index of a Sidelink Configured Grant transmission resource. Further, the parameter represents a slot index within a radio frame period. A value range of this parameter is $[0, N-1]$. N represents a total number of slots included in a radio frame period. For example, for a Subcarrier spacing of 15 kHz, a radio frame includes 10 slots and a radio frame period includes 10240 slots, so a value range of this parameter is [0, 10239].

(2) periodicity represents a period of a Sidelink Configured Grant transmission resource. Optionally, the parameter is represented by a time length, such as 100 ms, 200 ms, and 500 ms. Optionally, the parameter is represented by a number of slots. Further, the parameter is represented by a number of physical slots. For example, periodicity=100 slots, 200 slots, etc. In a case of the Subcarrier spacing of 15 kHz, a period of 100 ms may correspond to 100 slots. In a case of a Subcarrier spacing of 30 kHz, a period of 100 ms may correspond to 200 slots, and so on.

(3) nrofHARQ-Processes represents a total number of HARQ process IDs corresponding to the Sidelink Configured Grant.

(4) harq-procID-offset is used for determining a first HARQ process ID corresponding to the Sidelink Configured Grant. Optionally, if a network side device does not configure the parameter, a value of the parameter is 0.

In the above formula, mod represents a modulo operation and floor represents a downward rounding operation.

In an optional embodiment, a terminal receives configuration information from the network side device and determines a slot where a Sidelink Configured Grant transmission resource is located according to the configuration information.

Optionally, at least one of following parameters may be determined through the above configuration information: (1) a period of a Sidelink Configured Grant transmission resource; (2) a total number of HARQ process IDs corresponding to current Configured Grant; (3) a HARQ process ID offset, which is used for determining a first HARQ process ID corresponding to the current Configured Grant; (4) a slot corresponding to a time domain resource of a Sidelink Configured Grant transmission resource.

In an optional embodiment, the configuration information includes slot offset indication information, time domain resource indication information, and a period parameter. A Sidelink Configured Grant transmission resource is determined based on the slot offset indication information, the time domain resource indication information, and the period parameter. The slot offset indication information is used for determining time domain information of a first Sidelink Configured Grant transmission resource in a system frame number period (or in a direct frame number period). Optionally, the slot offset indication information is represented by a number of physical slots. The time domain resource indication information is used for determining a time domain position of a Sidelink Configured Grant transmission resource configured in a Sidelink Configured Grant period, for example, one, two, or three values are determined according to the time domain resource indication information, and these values represent slot intervals of the time domain positions of the Sidelink Configured Grant transmission resources with respect to a time domain position determined according to the slot offset indication information. For example, if the two values determined according to the time domain resource indication information are 3 and 7, respectively, and the time domain position determined according to the slot offset indication information is slot 1, slots where Sidelink Configured Grant transmission resources are located are slots 4 and 8. The period parameter is used for determining a period of the Sidelink Configured Grant transmission resource, and is represented by a time length or a number of physical slots.

For example, a terminal receives configuration information sent by a network for configuring Sidelink Configured Grant transmission resources, and slots of the Sidelink Configured Grant transmission resources determined according to the configuration information are: slot 2, 102, 202, 302, 402, 502, 602, 702, 802, etc. A period of Sidelink Configured Grant is 100 slots, including three HARQ process IDs, and a HARQ process ID offset is 0. Therefore, HARQ process IDs corresponding to the Sidelink Configured Grant are 0, 1, and 2. Therefore, HARQ process IDs corresponding to various Sidelink Configured Grant transmission resources are determined according to the above formula. Table 1 shows a correspondence relationship between Sidelink Configured Grant transmission resources and HARQ process IDs. Table 1 is shown as follows.

TABLE 1

| Slot index of Sidelink Configured Grant transmission resource | | | | | | | | | |
|---|---|---|---|---|---|---|---|---|---|
| | 2 | 102 | 202 | 302 | 402 | 502 | 602 | 702 | 802 |
| HARQ process ID | 0 | 1 | 2 | 0 | 1 | 2 | 0 | 1 | 2 |

Optionally, the above method may further include the following execution act: a terminal transmits first Sidelink data on the Sidelink Configured Grant resource, wherein the first Sidelink data corresponds to a second Hybrid Automatic Repeat reQuest process ID.

Optionally, the second Hybrid Automatic Repeat reQuest process ID is the same as the first Hybrid Automatic Repeat reQuest process ID.

Optionally, the second Hybrid Automatic Repeat reQuest process ID is different from the first Hybrid Automatic Repeat reQuest process ID, and the terminal device determines a correspondence relationship between the first HARQ process ID and the second HARQ process ID.

A HARQ process ID corresponding to the Sidelink Configured Grant transmission resource determined by a terminal device through the above manner is the first HARQ process ID. The terminal device may use the second HARQ process ID to transmit the first sidelink data. The terminal determines the correspondence relationship between the first HARQ process ID and the second HARQ process ID. The first sidelink data may include a PSCCH and a PSSCH. In addition, the terminal device may also carry the second HARQ process ID in Sidelink Control Information (SCI), that is, sidelink data transmitted in the PSSCH corresponds to the second HARQ process ID.

Optionally, a network side device configures one PUCCH transmission resource in each period of Sidelink Configured Grant. In a period of Sidelink Configured Grant, the terminal sends the first Sidelink data to a receiving end terminal through a Sidelink Configured Grant transmission resource. If sidelink feedback information sent by the receiving end terminal received by the terminal is a NACK, the terminal reports the NACK to the network side device through a PUCCH in the period. According to a transmission resource of the PUCCH, the network side device may determine a time domain position of a Sidelink Configured Grant transmission resource corresponding to the PUCCH, so as to determine a HARQ process ID corresponding to sidelink data transmitted on the Sidelink Configured Grant transmission resource, namely the first HARQ process ID. If the network side device receives NACK feedback information reported by the terminal, it dynamically allocates a retransmission resource for the sidelink transmission through DCI, and indicates the first HARQ process ID in the DCI, so that the terminal device retransmits first sidelink data on a sidelink transmission resource scheduled by the downlink control information.

Optionally, the above method may further include the following execution acts.

In a first act, the terminal receives DCI from the network side device, wherein the DCI is used for scheduling a sidelink transmission resource, and the downlink control information carries a first HARQ process ID.

In a second act, according to the first HARQ process ID carried in the DCI and a correspondence relationship between the first HARQ process ID and a second HARQ process ID, the terminal determines that the DCI is used for scheduling first sidelink data.

In a third act, the terminal retransmits the first sidelink data on the sidelink transmission resource scheduled by DCI.

In an optional implementation, the network side device determines the first HARQ process ID by using the following acts.

In a first act, the network side device determines that sidelink feedback information reported by the terminal is received on a PUCCH transmission resource.

In a second act, the network side device determines at least one of a first parameter and a second parameter. The first parameter is used for determining a time interval between an uplink transmission resource and a sidelink feedback channel transmission resource, and the second parameter is used for determining a time interval between the sidelink feedback channel transmission resource and a Sidelink Configured Grant transmission resource.

In a third act, the network side device determines a slot of a corresponding sidelink transmission resource according to the PUCCH transmission resource and at least one of the first parameter and the second parameter.

In a fourth act, the network side device determines a first HARQ process ID corresponding to the sidelink transmission resource according to the following formula.

HARQ Process ID=[floor(CURRENT_slot/periodicity)]mod nrofHARQ-Processes+harq-procID-offset Herein, meanings of various parameters in this formula are as follows.

(1) CURRENT_slot represents a slot index of a Sidelink Configured Grant transmission resource. Further, the parameter represents a slot index within a radio frame period. A value range of this parameter is [0, N−1]. N represents a total number of slots included in a radio frame period. For example, for a Subcarrier spacing of 15 kHz, a radio frame includes 10 slots and a radio frame period includes 10240 slots, so a value range of this parameter is [0, 10239].

(2) periodicity represents a period of a Sidelink Configured Grant transmission resource. Optionally, the parameter is represented by a time length, such as 100 ms, 200 ms, and 500 ms. Optionally, the parameter is represented by a number of slots. Further, the parameter is represented by a number of physical slots. For example, periodicity=100 slots, 200 slots, etc. In a case of the Subcarrier spacing of 15 kHz, a period of 100 ms may correspond to 100 slots. In a case of a Subcarrier spacing of 30 kHz, a period of 100 ms may correspond to 200 slots, and so on.

(3) nrofHARQ-Processes represents a total number of HARQ process IDs corresponding to the Sidelink Configured Grant.

(4) harq-procID-offset is used for determining a first HARQ process ID corresponding to the Sidelink Configured Grant. Optionally, if the network side device does not configure the parameter, a value of the parameter is 0.

In the above formula, mod represents a modulo operation and floor represents a downward rounding operation.

Figure 13:
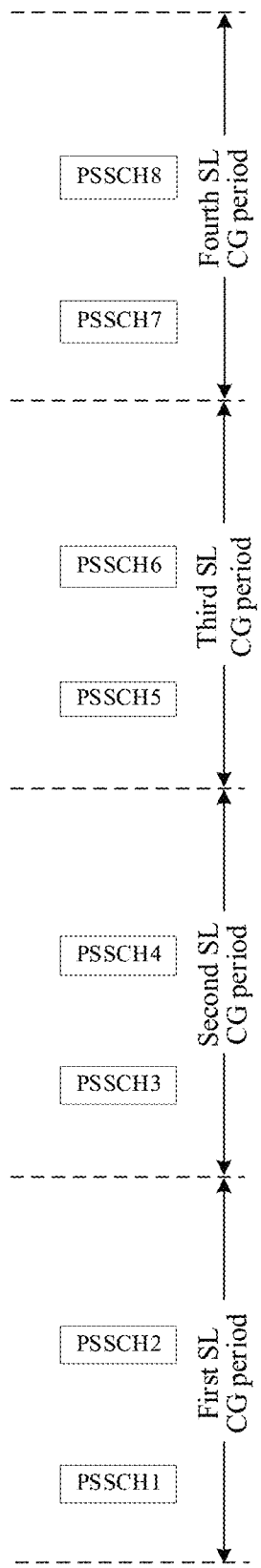
FIG. 13 is a schematic diagram of autonomously determining a HARQ process ID by a terminal device according to an optional embodiment of the present disclosure.

FIG. 13 is a schematic diagram of autonomously determining a HARQ process ID by a terminal device according to an optional embodiment of the present disclosure. As shown in FIG. 13, a network side device configures Sidelink Configured Grant transmission resources, two Sidelink Configured Grant transmission resources are included in each period, and a total number of HARQ processes of the Sidelink Configured Grant is 4, which are HARQ ID0, HARQ ID1, HARQ ID2, and HARQ ID3 respectively. Optionally, a TX UE uses PSSCH1, PSSCH2, PSSCH3, and PSSCH4 to transmit initial transmissions of HARQ ID0, HARQ ID1, HARQ ID2, and HARQ ID3, respectively. If all feedback information received by the TX UE is the NACK, the TX UE may continue to use PSSCH5, PSSCH6, PSSCH7, and PSSCH8 to perform retransmissions of HARQ ID0, HARQ ID1, HARQ ID2, and HARQ ID3, respectively.

Optionally, the TX UE uses PSSCH1 and PSSCH2 to transmit an initial transmission and retransmission of HARQ ID0, respectively. The TX UE uses PSSCH3 and PSSCH4 to transmit an initial transmission and retransmission of HARQ ID1, respectively. The TX UE uses PSSCH5 and PSSCH6 to transmit an initial transmission and retransmission of HARQ ID2, respectively. The TX UE uses PSSCH7 and PSSCH8 to transmit an initial transmission and retransmission of HARQ ID3, respectively.

Optionally, the TX UE uses PSSCH1 and PSSCH2 to transmit an initial transmission and retransmission of HARQ ID0, respectively. If received feedback information is still the NACK, the TX UE continues to use PSSCH3 to transmit a retransmission of HARQ ID0. If received feedback information becomes an ACK, the TX UE uses PSSCH4 to transmit an initial transmission of HARQ ID1 or uses PSSCH4 to transmit an initial transmission of HARQ ID0. At this time, sidelink data transmitted by PSSCH4 and PSSCH1 correspond to different transport blocks.

Through description of the above implementations, those skilled in the art may clearly understand that the methods according to the above embodiments may be implemented by means of software plus a necessary general hardware platform, and of course they may also be implemented through hardware, but the former is the better implementation in many cases. Based on such understanding, technical solutions of the present disclosure, in essence, or the part contributing to the prior art, may be embodied in a form of a software product, and the computer software product is stored in a storage medium (such as a Read-Only Memory (ROM)/Random Access Memory (RAM), a magnetic disk, and an optical disk), including several instructions for enabling a terminal device (which may be a mobile phone, a computer, a server, or a network side device) to perform the methods described in various embodiments of the present disclosure.

In an embodiment, an information processing apparatus is also provided, the apparatus is used for achieving the above embodiments and preferred implementations, those of which already described will not be repeated. As used below, a term "module" may be a combination of software and/or hardware that implements a predetermined function. Although an apparatus described in following embodiments is preferably implemented in software, an implementation in hardware or a combination of software and hardware is also possible and contemplated.

Figure 14:
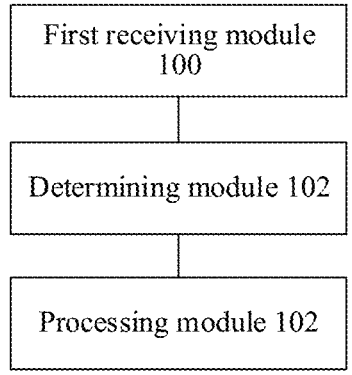
FIG. 14 is a block diagram of a structure of an information processing apparatus according to an embodiment of the present disclosure.

FIG. 14 is a block diagram of a structure of an information processing apparatus according to an embodiment of the present disclosure. As shown in FIG. 14, the apparatus includes: a first receiving module 100 configured to receive configuration information from a network side device, wherein the configuration information is used for configuring a Sidelink Configured Grant transmission resource, and the Sidelink Configured Grant transmission resource is a transmission resource located in a resource pool; a determining module 102 configured to determine time domain information corresponding to the Sidelink Configured Grant transmission resource based on the configuration information; and a processing module 104 configured to determine a first Hybrid Automatic Repeat reQuest process ID according to the time domain information corresponding to the Sidelink Configured Grant transmission resource.

Optionally, the determining module 102 is configured to determine a period parameter based on the configuration information, wherein the period parameter is a period of the Sidelink Configured Grant transmission resource; and determine the first Hybrid Automatic Repeat reQuest process ID according to the time domain information corresponding to the Sidelink Configured Grant transmission resource and the period parameter.

Optionally, the period of the Sidelink Configured Grant transmission resources is represented by a number of slots.

Optionally, the time domain information corresponding to the Sidelink Configured Grant transmission resource is a slot index of the Sidelink Configured Grant transmission resource in a resource pool.

Figure 15:
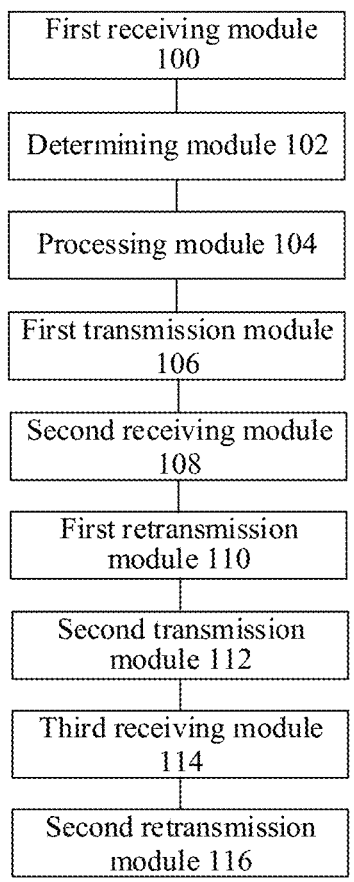
FIG. 15 is a block diagram of a structure of an information processing apparatus according to an optional embodiment of the present disclosure.

Optionally, FIG. 15 is a block diagram of a structure of an information processing apparatus according to an optional embodiment of the present disclosure. As shown in FIG. 15, the apparatus further includes a first transmission module 106 configured to transmit first sidelink data on a Sidelink Configured Grant resource, wherein the first sidelink data corresponds to a first Hybrid Automatic Repeat reQuest process ID.

Optionally, as shown in FIG. 15, the apparatus further includes: a second receiving module 108 configured to receive downlink control information from a network side device, wherein the downlink control information is used for scheduling a sidelink transmission resource, and the downlink control information carries the first Hybrid Automatic Repeat reQuest process ID; and a first retransmission module 110 configured to retransmit the first sidelink data on the sidelink transmission resource scheduled by the downlink control information.

Optionally, as shown in FIG. 15, the apparatus further includes: a second transmission module 112 configured to transmit second sidelink data on a Sidelink Configured Grant transmission resource based on a mapping relationship between the first Hybrid Automatic Repeat reQuest process ID and a second Hybrid Automatic Repeat reQuest process ID, wherein the second sidelink data corresponds to the second Hybrid Automatic Repeat reQuest process ID.

Optionally, as shown in FIG. 15, the apparatus further includes: a third receiving module 114 configured to receive downlink control information from a network side device, wherein the downlink control information is used for scheduling a sidelink transmission resource, and the downlink control information carries the first Hybrid Automatic Repeat reQuest process ID; and a second retransmission module 116 configured to retransmit the second sidelink data on the sidelink transmission resource scheduled by the downlink control information.

In an embodiment, another information processing apparatus is also provided, the apparatus is used for achieving the above embodiments and preferred implementations, those of which already described will not be repeated. As used below, a term "module" may be a combination of software and/or hardware that implements a predetermined function. Although an apparatus described in following embodiments is preferably implemented in software, an implementation in hardware or a combination of software and hardware is also possible and contemplated.

Figure 16:
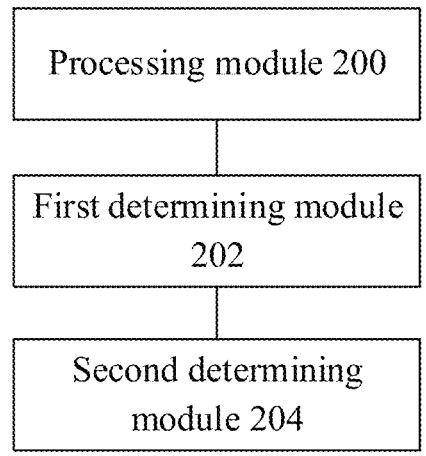
FIG. 16 is a block diagram of a structure of another information processing apparatus according to an embodiment of the present disclosure.

FIG. 16 is a block diagram of a structure of another information processing apparatus according to an embodiment of the present disclosure. As shown in FIG. 16, the apparatus includes: a processing module 200 configured to determine first configuration information, wherein the first configuration information is used for configuring a Sidelink Configured Grant transmission resource, and the Sidelink Configured Grant transmission resource is a transmission resource located in a resource pool; a first determining module 202 configured to determine time domain information corresponding to the Sidelink Configured Grant transmission resource based on the first configuration information; and a second determining module 204 configured to determine a first Hybrid Automatic Repeat reQuest process ID according to the time domain information corresponding to the Sidelink Configured Grant transmission resource.

Optionally, the second determining module 204 is configured to determine a period parameter based on the first configuration information, wherein the period parameter is a period of the Sidelink Configured Grant transmission resource; and determine the first Hybrid Automatic Repeat reQuest process ID according to the time domain information corresponding to the Sidelink Configured Grant transmission resource and the period parameter.

Optionally, the period of the Sidelink Configured Grant transmission resources is represented by a number of slots.

Optionally, the time domain information corresponding to the Sidelink Configured Grant transmission resource is a slot index of the Sidelink Configured Grant transmission resource in a resource pool.

Optionally, the first determining module 202 is configured to receive an uplink control channel sent by a terminal on an uplink transmission resource based on the first configuration information, wherein the uplink transmission resource and the Sidelink Configured Grant transmission resource belong to a same Sidelink Configured Grant period, and the uplink control channel is used for the terminal to report sidelink feedback information; and determine the time domain information corresponding to the Sidelink Configured Grant transmission resource according to the time domain information of the uplink transmission resource.

Figure 17:
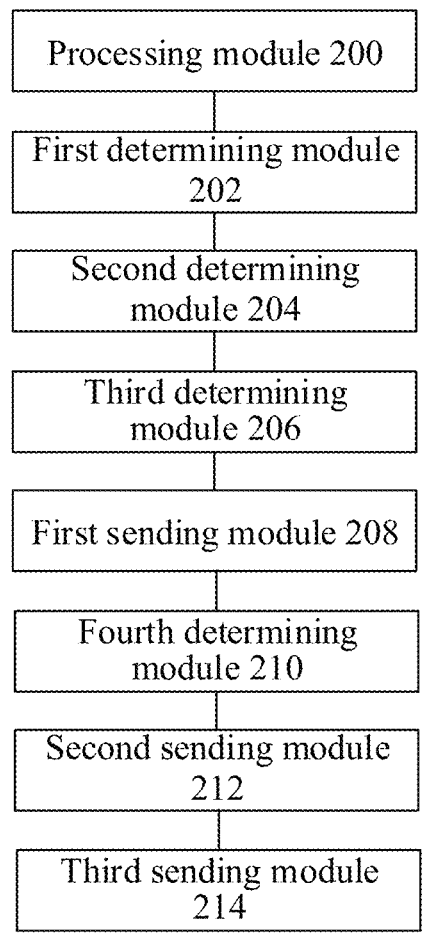
FIG. 17 is a block diagram of a structure of another information processing apparatus according to an optional embodiment of the present disclosure.

Optionally, FIG. 17 is a block diagram of a structure of another information processing apparatus according to an optional embodiment of the present disclosure. As shown in FIG. 17, the apparatus further includes: a third determining module 206 configured to determine at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the first determining module 202 is further configured to determine the time domain information corresponding to the Sidelink Configured Grant transmission resource, according to the time domain information of the uplink transmission resource and at least one of the first parameter and the second parameter.

Optionally, the first configuration information is further used for configuring at least one of the uplink transmission resource and the first parameter.

Optionally, as shown in FIG. 17, the apparatus further includes: a first sending module 208 configured to send second configuration information to the terminal, wherein the second configuration information is used for configuring a resource pool; and a fourth determining module 210 configured to determine the second parameter according to the second configuration information.

Optionally, as shown in FIG. 17, the apparatus further includes: a second sending module 212 configured to send downlink control information to the terminal when an uplink control channel carries non-acknowledgement information, wherein the downlink control information is used for scheduling a sidelink transmission resource, the downlink control information carries the first Hybrid Automatic Repeat reQuest process ID, and the downlink control information is used for scheduling the terminal to retransmit sidelink data corresponding to the first Hybrid Automatic Repeat reQuest process ID on the sidelink transmission resource.

Optionally, as shown in FIG. 17, the apparatus further includes a third sending module 214 configured to send first configuration information to the terminal, wherein the first configuration information is further used for the terminal to determine the time domain information corresponding to the Sidelink Configured Grant transmission resource and to determine the first Hybrid Automatic Repeat reQuest process ID according to the time domain information corresponding to the Sidelink Configured Grant transmission resource.

In an embodiment, another information processing apparatus is also provided, the apparatus is used for achieving the above embodiments and preferred implementations, those of which already described will not be repeated. As used below, a term "module" may be a combination of software and/or hardware that implements a predetermined function. Although an apparatus described in following embodiments is preferably implemented in software, an implementation in hardware or a combination of software and hardware is also possible and contemplated.

Figure 18:
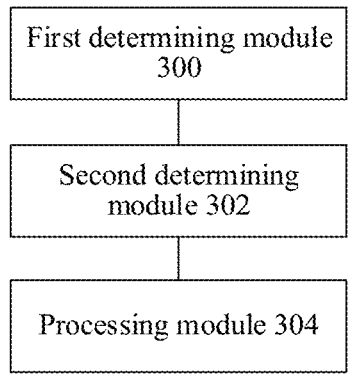
FIG. 18 is a block diagram of a structure of yet another information processing apparatus according to an embodiment of the present disclosure.

FIG. 18 is a block diagram of a structure of another information processing apparatus according to an embodiment of the present disclosure. As shown in FIG. 18, the apparatus includes: a first determining module 300 configured to determine first configuration information, wherein the first configuration information is used for configuring an uplink transmission resource; a second determining module 302 configured to determine time domain information corresponding to the uplink transmission resource based on the first configuration information; and a processing module 304 configured to determine a first Hybrid Automatic Repeat reQuest process ID according to the time domain information corresponding to the uplink transmission resource.

Figure 19:
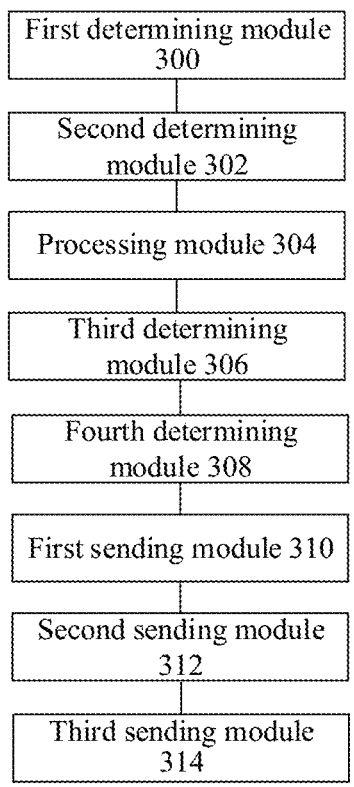
FIG. 19 is a block diagram of a structure of yet another information processing apparatus according to an optional embodiment of the present disclosure.

Optionally, FIG. 19 is a block diagram of a structure of another information processing apparatus according to an optional embodiment of the present disclosure. As shown in FIG. 19, the apparatus further includes: a third determining module 306 configured to determine a period parameter based on the first configuration information, wherein the first configuration information is also used for configuring a Sidelink Configured Grant transmission resource, the Sidelink Configured Grant transmission resource is used for transmitting sidelink data, and the period parameter is used for determining a period of the Sidelink Configured Grant transmission resources; and a fourth determining module 308 configured to determine the first Hybrid Automatic Repeat reQuest process ID according to the time domain information corresponding to the uplink transmission resource and the period parameter. Herein, the Sidelink Configured Grant transmission resource and the uplink transmission resource are associated, that is, sidelink feedback information corresponding to the sidelink data transmitted on the Sidelink Configured Grant transmission resource is transmitted to the network side device on the uplink transmission resource.

Optionally, the time domain information corresponding to the Sidelink Configured Grant transmission resource is a slot index of the Sidelink Configured Grant transmission resource in a resource pool.

Optionally, the period parameter is represented by a number of slots, and the number of slots is a number of slots in a resource pool or a number of candidate slots for a resource pool.

Optionally, as shown in FIG. 19, the apparatus further includes: a first sending module 310 configured to send downlink control information to a terminal, wherein the downlink control information is used for scheduling a sidelink transmission resource, the downlink control information carries the first Hybrid Automatic Repeat reQuest process ID, and the downlink control information is used for scheduling a terminal device to retransmit sidelink data corresponding to the first Hybrid Automatic Repeat reQuest process ID on the sidelink transmission resource.

Optionally, as shown in FIG. 19, the apparatus further includes a second sending module 312 configured to send downlink control information to the terminal when a negative acknowledgement is detected on the uplink transmission resource.

Optionally, as shown in FIG. 19, the apparatus further includes a third sending module 314 configured to send the first configuration information to the terminal device.

In an embodiment, yet another information processing apparatus is also provided, the apparatus is used for achieving the above embodiments and preferred implementations, those of which already described will not be repeated. As used below, a term "module" may be a combination of software and/or hardware that implements a predetermined function. Although an apparatus described in following embodiments is preferably implemented in software, an implementation in hardware or a combination of software and hardware is also possible and contemplated.

Figure 20:
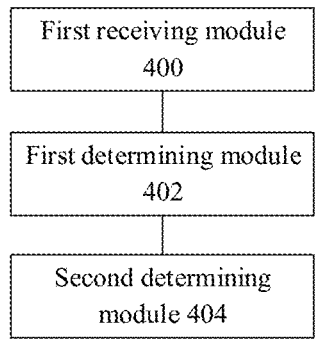
FIG. 20 is a block diagram of a structure of yet another information processing apparatus according to an embodiment of the present disclosure.

FIG. 20 is a block diagram of a structure of yet another information processing apparatus according to an embodiment of the present disclosure. As shown in FIG. 20, the apparatus includes: a first receiving module 400 configured to receive configuration information from a network side device, wherein the configuration information is used for an uplink transmission resource; a first determining module 402 configured to determine time domain information corresponding to the uplink transmission resource based on the configuration information; and a second determining module 404 configured to determine a first Hybrid Automatic Repeat reQuest process ID according to the time domain information corresponding to the uplink transmission resource.

Optionally, the configuration information is also used for configuring a Sidelink Configured Grant transmission resource for transmitting sidelink data.

Figure 21:
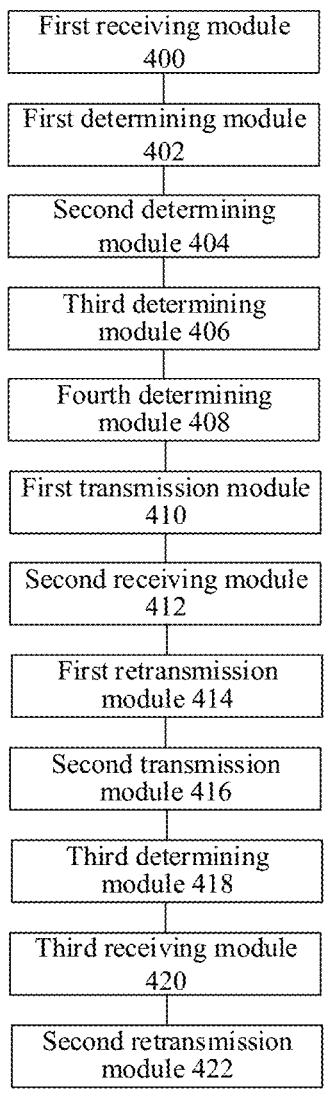
FIG. 21 is a block diagram of a structure of yet another information processing apparatus according to an optional embodiment of the present disclosure.

Optionally, FIG. 21 is a block diagram of a structure of yet another information processing apparatus according to an optional embodiment of the present disclosure. As shown in FIG. 21, the apparatus further includes: a third determining module 406 configured to determine at least one of following parameters: a first parameter and a second parameter; wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource.

Optionally, the apparatus further includes: a fourth determining module 408 configured to determine time domain information corresponding to the Sidelink Configured Grant transmission resource according to the time domain information corresponding to the uplink transmission resource and at least one of the first parameter and the second parameter, and obtain a correspondence relationship between the uplink transmission resource and the Sidelink Configured Grant transmission resource; determine a Sidelink Configured Grant transmission resource corresponding to the first Hybrid Automatic Repeat reQuest process ID according to the first Hybrid Automatic Repeat reQuest process ID and the correspondence relationship between the uplink transmission resource and the Sidelink Configured Grant transmission resource.

Optionally, as shown in FIG. 21, the apparatus further includes: a first transmission module 410 configured to transmit first sidelink data on a Sidelink Configured Grant resource, wherein the first sidelink data corresponds to the first Hybrid Automatic Repeat reQuest process ID.

Optionally, as shown in FIG. 21, the apparatus further includes: a second receiving module 412 configured to receive downlink control information sent by a network side device, wherein the downlink control information is used for scheduling a sidelink transmission resource, and the downlink control information carries the first Hybrid Automatic Repeat reQuest process ID; and a first retransmission module 414 configured to retransmit the first sidelink data on the sidelink transmission resource.

Optionally, as shown in FIG. 21, the apparatus further includes: a second transmission module 416 configured to transmit second sidelink data on a Sidelink Configured Grant transmission resource, wherein the second sidelink data corresponds to a second Hybrid Automatic Repeat reQuest process ID.

Optionally, as shown in FIG. 21, the apparatus further includes: a third determining module 418 configured to determine a mapping relationship between the first Hybrid Automatic Repeat reQuest process ID and the second Hybrid Automatic Repeat reQuest process ID.

Optionally, as shown in FIG. 21, the apparatus further includes: a third receiving module 420 configured to receive downlink control information sent by a network side device, wherein the downlink control information is used for scheduling a sidelink transmission resource, and the downlink control information carries the first Hybrid Automatic Repeat reQuest process ID; and a second retransmission module 422 configured to retransmit the second sidelink data on the sidelink transmission resource based on the mapping relationship between the first Hybrid Automatic Repeat reQuest process ID and the second Hybrid Automatic Repeat reQuest process ID.

It should be noted that the above modules may be achieved through software or hardware, and for the latter, they may be achieved in following ways, but are not limited thereto: all the above modules are located in a same processor; or, the above modules are located in different processors in a form of any combination.

Figure 22:
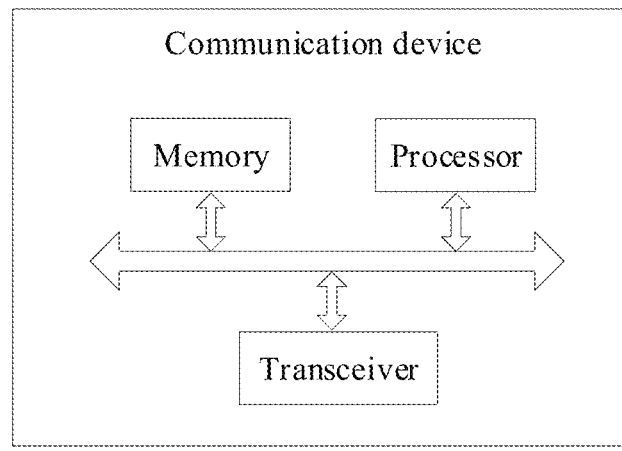
FIG. 22 is a schematic diagram of a structure of a communication device according to an embodiment of the present disclosure.

FIG. 22 is a schematic diagram of a structure of a communication device according to an embodiment of the present disclosure. As shown in FIG. 22, the communication device includes a processor. The processor may call and run a computer program from a memory to implement the methods in the embodiments of the present disclosure.

Optionally, as shown in FIG. 22, the communication device may further include a memory. The processor may call and run a computer program from the memory to implement the methods in the embodiments of the present disclosure.

The memory may be a separate device independent of the processor, or may be integrated in the processor.

Optionally, as shown in FIG. 22, the communication device may further include a transceiver, and the processor may control the transceiver to communicate with another device. Specifically, the transceiver may send information or data to another device, or receive information or data sent by another device.

The transceiver may include a transmitter and a receiver. The transceiver may further include antennas, a number of which may be one or more.

Optionally, the communication device may specifically be the network side device of the embodiments of the present disclosure, and the communication device may implement corresponding flows implemented by the network side device in various methods of the embodiments of the present disclosure, which will not be repeated here for brevity.

Optionally, the communication device may be specifically the mobile terminal/terminal device of the embodiments of the present disclosure, and the communication device may implement corresponding flows implemented by the mobile terminal/terminal device in various methods of the embodiments of the present disclosure, which will not be repeated here for brevity.

Figure 23:
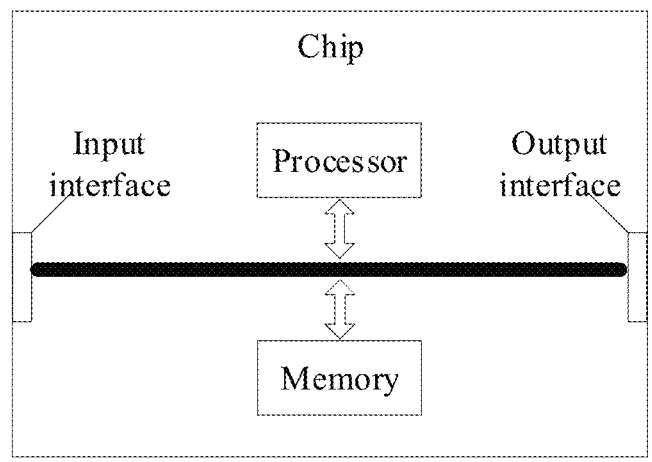
FIG. 23 is a schematic diagram of a structure of a chip according to an embodiment of the present disclosure.

FIG. 23 is a schematic diagram of a structure of a chip according to an embodiment of the present disclosure. As shown in FIG. 23, the chip includes a processor. The processor may call and run a computer program from a memory to implement the methods in the embodiments of the present disclosure.

Optionally, as shown in FIG. 23, the chip may further include a memory. The processor may call and run a computer program from the memory to implement the methods in the embodiments of the present disclosure.

The memory may be a separate device independent of the processor, or may be integrated in the processor.

Optionally, the chip may further include an input interface. The processor may control the input interface to communicate with another device or chip. Specifically, the processor may obtain information or data sent by another device or chip.

Optionally, the chip may further include an output interface. The processor may control the output interface to communicate with another device or chip. Specifically, the processor may output information or data to another device or chip.

Optionally, the chip may be applied to the network side device in the embodiments of the present disclosure, and the chip may implement corresponding flows implemented by the network side device in various methods of the embodiments of the present disclosure, which will not be repeated here for brevity.

Optionally, the chip may be applied to the mobile terminal/terminal device in the embodiments of the present disclosure, and the chip may implement corresponding flows implemented by the mobile terminal/terminal device in various methods of the embodiments of the present disclosure, which will not be repeated herein for brevity.

It should be understood that the chip mentioned in the embodiments of the present disclosure may be referred to as a system-level chip, a system chip, a chip system, or a system-on-chip, etc.

Figure 24:
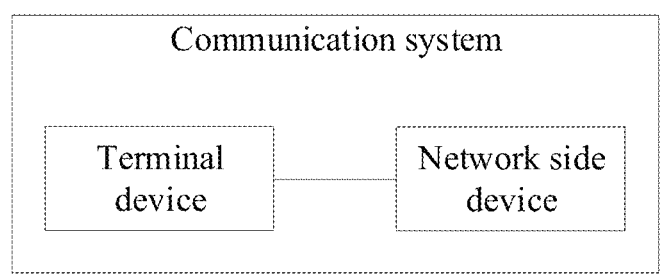
FIG. 24 is a block diagram of a structure of a communication system according to an embodiment of the present disclosure.

FIG. 24 is a block diagram of a structure of a communication system according to an embodiment of the present disclosure. As shown in FIG. 24, the communication system includes a terminal device and a network side device.

The terminal device may be configured to implement corresponding functions implemented by the terminal device in the above methods, and the network side device may be configured to implement corresponding functions implemented by the network side device in the above methods, which will not be repeated here for brevity.

It should be understood that, the processor in the embodiments of the present disclosure may be an integrated circuit chip having a signal processing capability. In an implementation process, various acts of the method embodiments described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement or perform the disclosed methods, acts and logical block diagrams in the embodiments of the present disclosure. The general purpose processor may be a microprocessor or the processor may be any conventional processor or the like. The acts of the methods disclosed in connection with the embodiments of the present disclosure may be directly embodied in the execution of a hardware decoding processor or in the execution by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads information in the memory and completes the acts of the above methods in combination with its hardware.

It should be understood that the memory in an embodiment of the present disclosure may be a volatile memory or a non-volatile memory, or it may include both volatile and non-volatile memory. The non-transitory memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the above memory is illustrative and should not be construed as a limitative description. For example, the memory in the embodiments of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, memories in the embodiments of the present disclosure are intended to include, but are not limited to, these and any other suitable types of memories.

An embodiment of the present disclosure further provides a computer readable storage medium configured to store a computer program.

Optionally, the computer readable storage medium may be applied to the network side device in the embodiments of the present disclosure, and the computer program enables a computer to perform corresponding flows implemented by the network side device in various methods of the embodiments of the present disclosure, which will not be repeated here for brevity.

Optionally, the computer readable storage medium may be applied to the mobile terminal/terminal device in the embodiments of the present disclosure, and the computer program enables a computer to perform corresponding flows implemented by the mobile terminal/terminal device in various methods of the embodiments of the present disclosure, which will not be repeated here for brevity.

An embodiment of the present disclosure further provides a computer program product including computer program instructions.

Optionally, the computer program product may be applied to the network side device in the embodiments of the present disclosure, and the computer program instructions enable a computer to perform corresponding flows implemented by the network side device in various methods of the embodiments of the present disclosure, which will not be repeated here for brevity.

Optionally, the computer program product may be applied to the mobile terminal/terminal device in the embodiments of the present disclosure, and the computer program instructions enable a computer to perform corresponding flows implemented by the mobile terminal/terminal device in various methods of the embodiments of the present disclosure, which will not be repeated here for brevity.

An embodiment of the present disclosure further provides a computer program.

Optionally, the computer program may be applied to the network side device in the embodiments of the present disclosure. When the computer program is run on a computer, the computer is enabled to perform corresponding flows implemented by the network side device in various methods of the embodiments of the present disclosure, which will not be repeated here for brevity.

Optionally, the computer program may be applied to the mobile terminal/terminal device in the embodiments of the present disclosure. When the computer program is run on a computer, the computer is enabled to perform corresponding flows implemented by the mobile terminal/terminal device in various methods of the embodiments of the present disclosure, which will not be repeated here for brevity.

Those of ordinary skills in the art will recognize that units and algorithm acts of various examples described in connection with the embodiments disclosed herein may be implemented in electronic hardware, or a combination of computer software and electronic hardware. Whether these functions are implemented in a form of hardware or software depends on a specific application and a design constraint of a technical solution. Skilled in the art may use different methods to achieve the described functions for each particular application, but such implementations should not be considered to be beyond the scope of the present disclosure.

Those skilled in the art may clearly understand that for convenience and conciseness of description, specific working processes of the systems, apparatuses, and units described above may refer to corresponding processes in the aforementioned method embodiments, and details will not be repeated here.

In several embodiments provided by the present disclosure, it should be understood that the disclosed systems, apparatus and methods may be implemented in other ways. For example, the apparatus embodiments described above are only exemplary. For example, a division of the units is only a division of logical functions, but there may be other division manners in actual implementations. For example, multiple units or components may be combined or integrated into another system, or some features may be ignored or not executed. In addition, mutual coupling or direct coupling or communication connection shown or discussed may be indirect coupling or communication connection between apparatuses or units through some interfaces, and may be in electrical, mechanical, or in other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the embodiments.

In addition, various functional units in various embodiments of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on such understanding, the technical solutions of the present disclosure, in essence, or the part contributing to the prior art, or part of the technical solutions, may be embodied in a form of a software product. The computer software product is stored in one storage medium, and includes several instructions for enabling one computer device (which may be a personal computer, a server, or a network side device, etc.) to perform all or part of acts of the methods described in various embodiments of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

What are described above are merely specific implementations of the present disclosure, but the protection scope of the present disclosure is not limited thereto. Variations or substitutions easily conceived by any person skilled in the art within the technical scope disclosed by the present disclosure shall be included within the protection scope of the present disclosure. Therefore, the protection scope of the present disclosure should be subject to the scope of the appended claims.

The invention claimed is:

1. An information processing method, comprising:
receiving configuration information from a network side device, wherein the configuration information is used for configuring a Sidelink Configured Grant transmission resource, and the Sidelink Configured Grant transmission resource is a transmission resource located in a resource pool;
determining time domain information corresponding to the Sidelink Configured Grant transmission resource based on the configuration information; and
determining a first Hybrid Automatic Repeat reQuest process identity, ID, according to the time domain information corresponding to the Sidelink Configured Grant transmission resource,
wherein the determining the first Hybrid Automatic Repeat reQuest process ID according to the time domain information corresponding to the Sidelink Configured Grant transmission resource comprises:
determining a period parameter based on the configuration information, wherein the period parameter is a period of the Sidelink Configured Grant transmission resource; and
determining the first Hybrid Automatic Repeat reQuest process ID according to the time domain information corresponding to the Sidelink Configured Grant transmission resource and the period parameter.

2. The method according to claim 1, wherein the determining the first Hybrid Automatic Repeat reQuest process ID according to the time domain information corresponding to the Sidelink Configured Grant transmission resource and the period parameter comprises:
determining the first Hybrid Automatic Repeat reQuest process ID through following formula:

$$\text{HARQ Process ID} = [\text{floor}(\text{CURRENT\_slot}/\text{periodicity})] \bmod \text{nrofHARQ-Processes} + \text{harq-procID-offset},$$

wherein CURRENT_slot represents a slot corresponding to a time domain resource of a Sidelink Configured Grant transmission resource, and an index of the slot is an index of a slot in a resource pool where Sidelink Configured Grant is located, a value range of this parameter is [0, N−1], N represents a total number of slots contained in a current resource pool, the index of the slot is an index of a slot in the resource pool where the Sidelink Configured Grant is located, periodicity represents a period of the Sidelink Configured Grant transmission resource, nrofHARQ-Processes represents a total number of HARQ process IDs corresponding to the Sidelink Configured Grant, and harq-procID-offset is used for determining a first HARQ process ID corresponding to the Sidelink Configured Grant.

3. The method according to claim 1, wherein the time domain information corresponding to the Sidelink Configured Grant transmission resource is a slot index of the Sidelink Configured Grant transmission resource in the resource pool.

4. The method according to claim 1, wherein the determining the time domain information corresponding to the Sidelink Configured Grant transmission resource based on the configuration information comprises:
sending an uplink control channel to the network side device on an uplink transmission resource based on the configuration information, wherein the uplink transmission resource and the Sidelink Configured Grant transmission resource belong to a same Sidelink Configured Grant period, and the uplink control channel is used for the terminal to report sidelink feedback information; and determining the time domain information corresponding to the Sidelink Configured Grant transmission resource according to time domain information of the uplink transmission resource.

5. The method according to claim 4, further comprising:
determining at least one of following parameters: a first parameter and a second parameter;
wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource,
wherein the determining the time domain information corresponding to the Sidelink Configured Grant transmission resource according to the time domain information of the uplink transmission resource comprises:
determining the time domain information corresponding to the Sidelink Configured Grant transmission resource according to the time domain information of the uplink transmission resource and at least one of the first parameter and the second parameter.

6. The method according to claim 5, wherein the configuration information comprises slot offset indication information and a period parameter, wherein the slot offset indication information is used for determining time domain information of a first Sidelink Configured Grant transmission resource in a period of a system frame number or in a period of a direct frame number.

7. The method according to claim 6, wherein the slot offset indication information is represented by a number of slots, and the number of slots represents a number of logical slots, wherein the logical slots are slots in a resource pool associated with the Configured Grant transmission resource or candidate slots for the resource pool.

8. An information processing apparatus, comprising:
a transceiver, configured to receive configuration information from a network side device, wherein the configuration information is used for configuring a Sidelink Configured Grant transmission resource, and the Sidelink Configured Grant transmission resource is a transmission resource located in a resource pool;
a processor, configured to determine time domain information corresponding to the Sidelink Configured Grant transmission resource based on the configuration information; and
determine a first Hybrid Automatic Repeat reQuest process identity, ID, according to the time domain information corresponding to the Sidelink Configured Grant transmission resource,
wherein the processor is specifically configured to:
determine a period parameter based on the configuration information, wherein the period parameter is a period of the Sidelink Configured Grant transmission resource; and
determine the first Hybrid Automatic Repeat reQuest process ID according to the time domain information corresponding to the Sidelink Configured Grant transmission resource and the period parameter.

9. The information processing apparatus according to claim 8, wherein processor is specifically configured to:
determine the first Hybrid Automatic Repeat reQuest process ID through following formula:

HARQ Process ID=[floor(CURRENT_slot/periodicity)]mod nrofHARQ-Processes+harq-procID-offset, wherein CURRENT_slot represents a slot corresponding to a time domain resource of a Sidelink Configured Grant transmission resource, and an index of the slot is an index of a slot in a resource pool where Sidelink Configured Grant is located, a value range of this parameter is [0, N−1], N represents a total number of slots contained in a current resource pool, the index of the slot is an index of a slot in the resource pool where the Sidelink Configured Grant is located, periodicity represents a period of the Sidelink Configured Grant transmission resource, nrofHARQ-Processes represents a total number of HARQ process IDs corresponding to the Sidelink Configured Grant, and harq-procID-offset is used for determining a first HARQ process ID corresponding to the Sidelink Configured Grant.

10. The information processing apparatus according to claim 8, wherein the time domain information corresponding to the Sidelink Configured Grant transmission resource is a slot index of the Sidelink Configured Grant transmission resource in the resource pool.

11. The information processing apparatus according to claim 8, wherein the processor is specifically configured to:
control the transceiver to send an uplink control channel to the network side device on an uplink transmission resource based on the configuration information, wherein the uplink transmission resource and the Sidelink Configured Grant transmission resource belong to a same Sidelink Configured Grant period, and the uplink control channel is used for the terminal to report sidelink feedback information; and
determine the time domain information corresponding to the Sidelink Configured Grant transmission resource according to time domain information of the uplink transmission resource.

12. The information processing apparatus according to claim 11, wherein the processor is further configured to:
determine at least one of following parameters: a first parameter and a second parameter;
wherein the first parameter is used for determining a time interval between the uplink transmission resource and a sidelink feedback channel transmission resource, and the second parameter is used for determining a time interval between the sidelink feedback channel transmission resource and the Sidelink Configured Grant transmission resource,
wherein the processor is specifically configured to:
determine the time domain information corresponding to the Sidelink Configured Grant transmission resource according to the time domain information of the uplink transmission resource and at least one of the first parameter and the second parameter.

13. The information processing apparatus according to claim 12, wherein the configuration information comprises slot offset indication information and a period parameter, wherein the slot offset indication information is used for determining time domain information of a first Sidelink Configured Grant transmission resource in a period of a system frame number or in a period of a direct frame number.

14. The information processing apparatus according to claim 13, wherein the slot offset indication information is represented by a number of slots, and the number of slots represents a number of logical slots, wherein the logical slots are slots in a resource pool associated with the Configured Grant transmission resource or candidate slots for the resource pool.

15. An information processing apparatus, comprising:
a transceiver, configured to send configuration information to a terminal side device, wherein the configuration information is used for configuring a Sidelink Configured Grant transmission resource, the Sidelink Configured Grant transmission resource is a transmission resource located in a resource pool, the configuration information is used for determining time domain information corresponding to the Sidelink Configured Grant transmission resource and a period parameter, the time domain information corresponding to the Sidelink Configured Grant transmission resource is used for determining a first Hybrid Automatic Repeat reQuest process identity, ID, and the period parameter is a period of the Sidelink Configured Grant transmission resource,
wherein the time domain information corresponding to the Sidelink Configured Grant transmission resource and the period parameter are used for determining the first Hybrid Automatic Repeat reQuest process ID.

16. The information processing apparatus according to claim 15, wherein the first Hybrid Automatic Repeat reQuest process ID is determined through following formula:

HARQ Process ID=[floor(CURRENT_slot/periodicity)]mod nrofHARQ-Processes+harq-procID-offset, wherein CURRENT_slot represents a slot corresponding to a time domain resource of a Sidelink Configured Grant transmission resource, and an index of the slot is an index of a slot in a resource pool where Sidelink Configured Grant is located, a value range of this parameter is [0, N−1], N represents a total number of slots contained in a current resource pool, the index of the slot is an index of a slot in the resource pool where the Sidelink Configured Grant is located, periodicity represents a period of the Sidelink Configured Grant transmission resource, nrofHARQ-Processes represents a total number of HARQ process IDs corresponding to the Sidelink Configured Grant, and harq-procID-offset is used for determining a first HARQ process ID corresponding to the Sidelink Configured Grant.

17. The information processing apparatus according to claim 15, wherein the time domain information corresponding to the Sidelink Configured Grant transmission resource is a slot index of the Sidelink Configured Grant transmission resource in the resource pool.

18. The information processing apparatus according to claim 15, wherein the transceiver s further configured to:
receive an uplink control channel sent by the terminal side device on an uplink transmission resource based on the configuration information, wherein the uplink transmission resource and the Sidelink Configured Grant transmission resource belong to a same Sidelink Configured Grant period, the uplink control channel is used for the terminal to report sidelink feedback information, and the time domain information corresponding to the Sidelink Configured Grant transmission resource is determined according to time domain information of the uplink transmission resource.

19. The information processing apparatus according to claim 18, wherein a time interval between the uplink transmission resource and a sidelink feedback channel transmission resource is determined according to a first parameter, and a time interval between the sidelink feedback channel transmission resource and the Sidelink Configured Grant transmission resource is determined according to a second parameter,
wherein the time domain information of the uplink transmission resource and at least one of the first parameter and the second parameter are used for determining the time domain information corresponding to the Sidelink Configured Grant transmission resource.

20. The information processing apparatus according to claim 19, wherein the configuration information comprises slot offset indication information and a period parameter, and the slot offset indication information is used for determining time domain information of a first Sidelink Configured Grant transmission resource in a period of a system frame number or in a period of a direct frame number, wherein the slot offset indication information is represented by a number of slots, the number of slots represents a number of logical slots, and the logical slots are slots in a resource pool associated with the Configured Grant transmission resource or candidate slots for the resource pool.

* * * * *